(12) United States Patent
Johnson

(10) Patent No.: US 11,130,405 B2
(45) Date of Patent: Sep. 28, 2021

(54) SYSTEM AND METHOD OF POWERING AN EXTERNAL DEVICE WITH A VEHICULAR BATTERY SYSTEM

(71) Applicant: Keith Johnson, Fort Myers, FL (US)

(72) Inventor: Keith Johnson, Fort Myers, FL (US)

( * ) Notice: Subject to any disclaimer, the term of this patent is extended or adjusted under 35 U.S.C. 154(b) by 0 days.

(21) Appl. No.: 16/600,425

(22) Filed: Oct. 11, 2019

(65) Prior Publication Data

US 2020/0114764 A1     Apr. 16, 2020

Related U.S. Application Data

(60) Provisional application No. 62/744,542, filed on Oct. 11, 2018.

(51) Int. Cl.

| | |
|---|---|
| *B60L 1/00* | (2006.01) |
| *B60L 3/00* | (2019.01) |
| *H02G 3/00* | (2006.01) |
| *H02J 7/35* | (2006.01) |
| *H02J 7/00* | (2006.01) |
| *B60L 50/60* | (2019.01) |
| *B60L 53/20* | (2019.01) |
| *B60L 8/00* | (2006.01) |
| *H02J 7/34* | (2006.01) |

(52) U.S. Cl.
CPC ............... *B60L 1/00* (2013.01); *B60L 8/003* (2013.01); *B60L 50/66* (2019.02); *B60L 53/20* (2019.02); *H02J 7/0029* (2013.01); *H02J 7/342* (2020.01); *H02J 7/35* (2013.01); *B60L 2210/40* (2013.01); *H02J 2207/20* (2020.01)

(58) Field of Classification Search
CPC .. B60L 1/00; B60L 50/66; B60L 53/20; B60L 8/003; B60L 2210/40; B60L 58/20; B60L 50/64; H02J 7/342; H02J 7/35; H02J 7/0029; H02J 2207/20; H02J 7/0031; H02J 7/0071; H02J 7/0063; H02J 2310/48; Y02T 90/14; Y02T 10/7072; Y02T 10/70
USPC ......................................................... 307/9.1
See application file for complete search history.

(56) References Cited

U.S. PATENT DOCUMENTS

| | | | | |
|---|---|---|---|---|
| 6,002,221 | A * | 12/1999 | Ochiai .................. | B60L 3/0023 318/139 |
| 9,190,831 | B2 * | 11/2015 | Mitsutani ............ | B60L 15/2009 |
| 2011/0043165 | A1 * | 2/2011 | Kinser .................... | B60L 53/00 320/109 |

(Continued)

*Primary Examiner* — Richard Tan

(57) ABSTRACT

A system and method of powering an external device with a vehicular battery system allows a user to charge electrically-powered devices with the electrical power source of his or her vehicle. The system includes an electrically-driven vehicle which includes a high-voltage battery. The high voltage battery includes a pair of contactors and is contained within a battery casing. The system further includes a junction box which includes an input derived from the pair of contactors, an external output for off-vehicle charging, and an internal output for on-vehicle charging. The system further includes a power modifier, an auxiliary low-voltage battery and at least one external device. The auxiliary low-voltage battery is electrically connected to the high-voltage battery through the junction box and the power modifier. Thus, the auxiliary low-voltage battery is safely charged by the high-voltage battery. The auxiliary low-voltage battery can then be used to power the external device.

16 Claims, 27 Drawing Sheets

(56) References Cited

U.S. PATENT DOCUMENTS

| | | | |
|---|---|---|---|
| 2013/0234508 A1* | 9/2013 | Eisele | B60L 50/51 307/9.1 |
| 2014/0002021 A1* | 1/2014 | Bertness | B60L 50/16 320/109 |
| 2015/0061376 A1* | 3/2015 | Hartl | B60L 3/0046 307/9.1 |
| 2018/0037121 A1* | 2/2018 | Narla | B60L 11/1811 |

* cited by examiner

SYSTEM AND METHOD OF POWERING AN EXTERNAL DEVICE WITH A VEHICULAR BATTERY SYSTEM

The current application claims a priority to the U.S. Provisional Patent application Ser. No. 62/744,542 filed on Oct. 11, 2018.

FIELD OF THE INVENTION

The present invention relates generally to a field of electric vehicles. More specifically, the present invention relates to methods and systems to facilitate storing an electrical energy generated from an electrically-driven vehicle in an auxiliary battery with a kit.

BACKGROUND OF THE INVENTION

A hybrid vehicle usually generates a significant amount of electrical energy while operating and/or moving on a highway. Even at a time of braking from a high speed, a significant amount of electrical energy may be generated by the hybrid vehicle that may charge a battery of the hybrid vehicle. The electrical energy generated may be stored in an external energy storing element such as a battery and may further be used to power other electrical appliances such as home appliances (ovens, fans, lights), office appliances (printers, computers, fans, lights) etc. An external battery, in an instance, may not be easily connected or disconnected with the electrically-driven vehicle without interfering with the vehicles electronic control unit (ECU) and affecting the operation and performance of the electrically-driven vehicle. Further, a performance of the external battery in older and/or conventional systems, in an instance, may not be monitored or controlled by a user seamlessly through a smartphone. Another problem is that standard hybrid vehicles, unlike plug-in hybrid vehicles, do not provide a means for external connections.

Therefore, there is a need for improved methods and systems to facilitate storing an electrical energy generated from an electrically-driven vehicle in an auxiliary battery with a kit that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a block diagram representation of a system with an electrically-driven vehicle that may be connected with a portable hybrid generator through a kit is disclosed. The system, in an instance, may include, but not limited to, an electrically-driven vehicle, a high voltage battery, a contactor, a quick disconnect, a fuse, a diode, a power switching power supply, a direct current (DC)—alternating current (AC) inverter.

According to some aspects, a block diagram representation of a system with an electrically-driven vehicle that may be connected with a portable power system through a kit is disclosed. The system, in an instance, may include, but not limited to, an electrically-driven vehicle, a high voltage battery, a low-voltage battery, a contactor, a quick disconnect, a fuse, a diode, a power switching power supply, an intelligent charge controller, an auxiliary battery, a DC-AC inverter.

According to some aspects, a block diagram representation of a system with an electrically-driven vehicle that may be connected with a power charging system is disclosed. The system, in an instance, may include, but not limited to, an electrically-driven vehicle, a high voltage battery, a low-voltage battery, a contactor, a quick disconnect, a fuse, a diode, a power switching power supply, an intelligent charge controller, an auxiliary low-voltage battery.

According to some aspects, a block diagram representation of a system of an electrically-driven vehicle with an onboard charging system is disclosed. The system, in an instance, may include, but not limited to, an electrically-driven vehicle, a high voltage battery, a contactor, an ICE, an inverter generator, a power switching power supply, an intelligent charge controller, an auxiliary low-voltage battery.

According to some aspects, a block diagram representation of a Hybrid Multi-Voltage Auxiliary Charging Power System, (HMVACPS) is disclosed. The HMVACPS, in an instance, may include, but not limited to, an electrically-driven vehicle, a high voltage battery, a contactor, a quick disconnect, a fuse, a diode, an MPPT charge controller, and/or an auxiliary battery.

According to some aspects, a block diagram representation of an electrically-driven vehicle with a kit is disclosed.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

DETAIL DESCRIPTIONS OF THE INVENTION

All illustrations of the drawings are for the purpose of describing selected versions of the present invention and are not intended to limit the scope of the present invention.

Figure 1A:
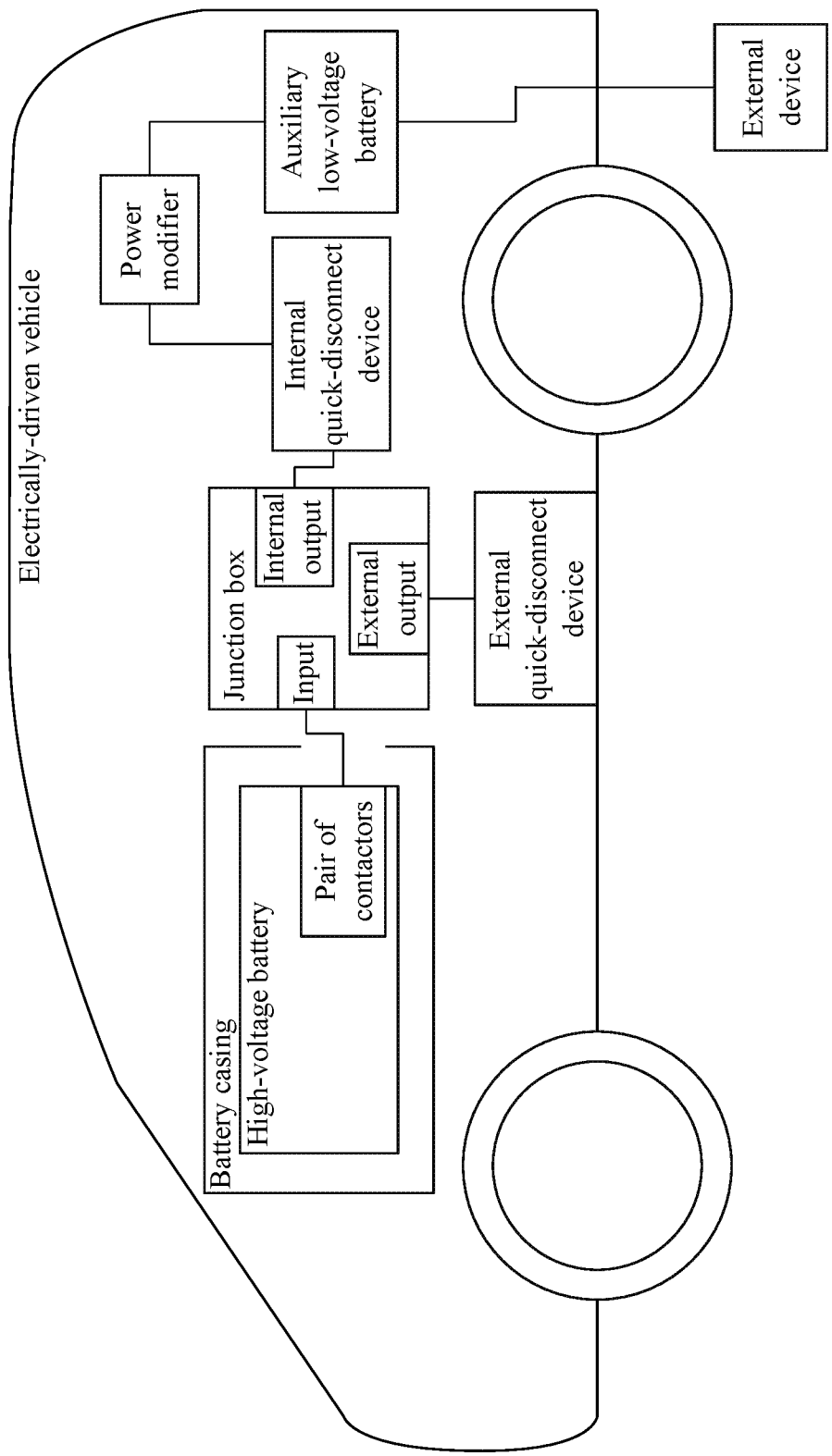
FIG. 1A is a schematic diagram illustrating the overall system of the present invention with the auxiliary low-voltage battery being charged while the electrically-driven vehicle is in operation.
Figure 1B:
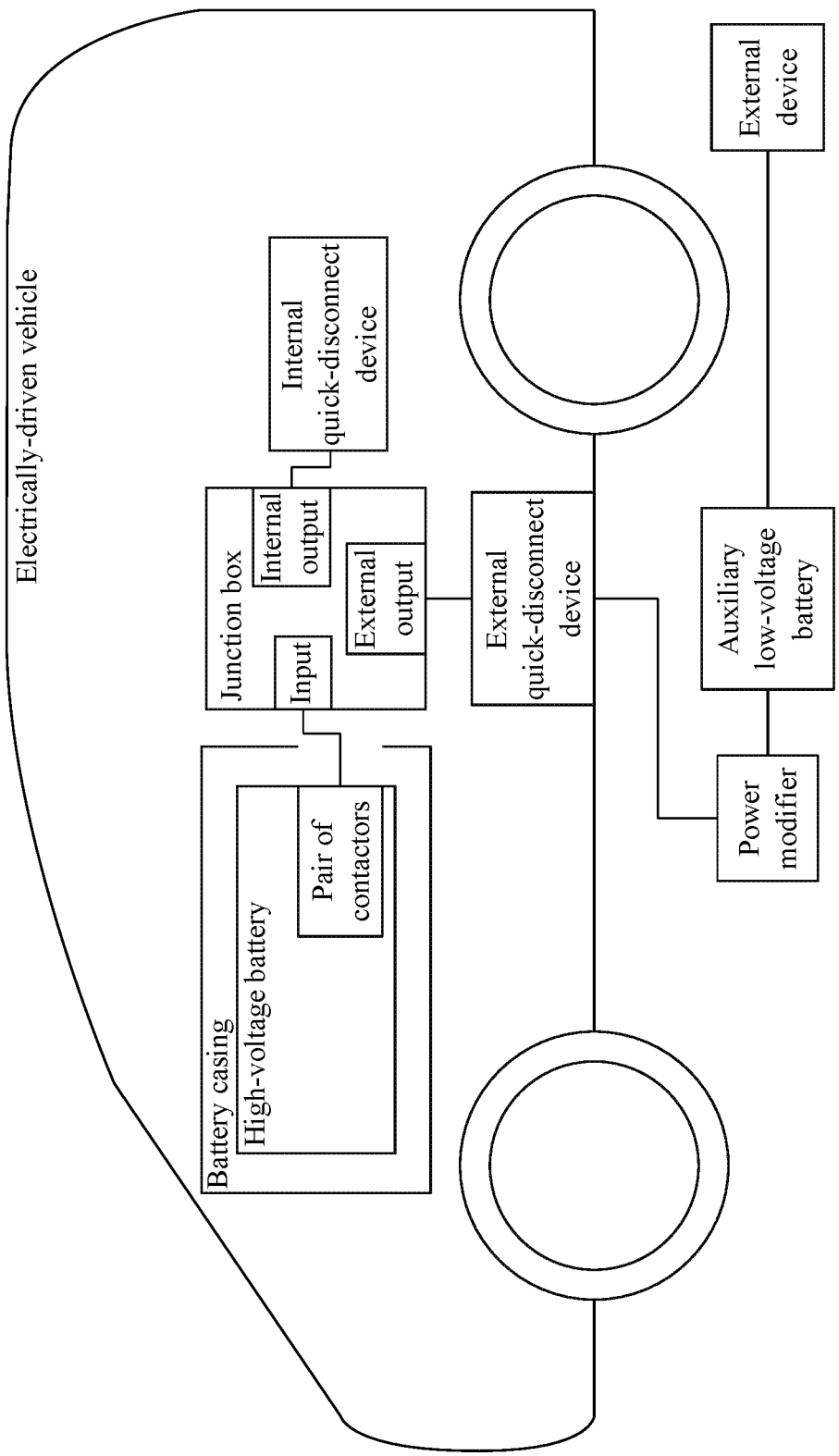
FIG. 1B is a schematic diagram illustrating the overall system of the present invention with the auxiliary low-voltage battery being charged while the electrically-driven vehicle is in park.
Figure 2:
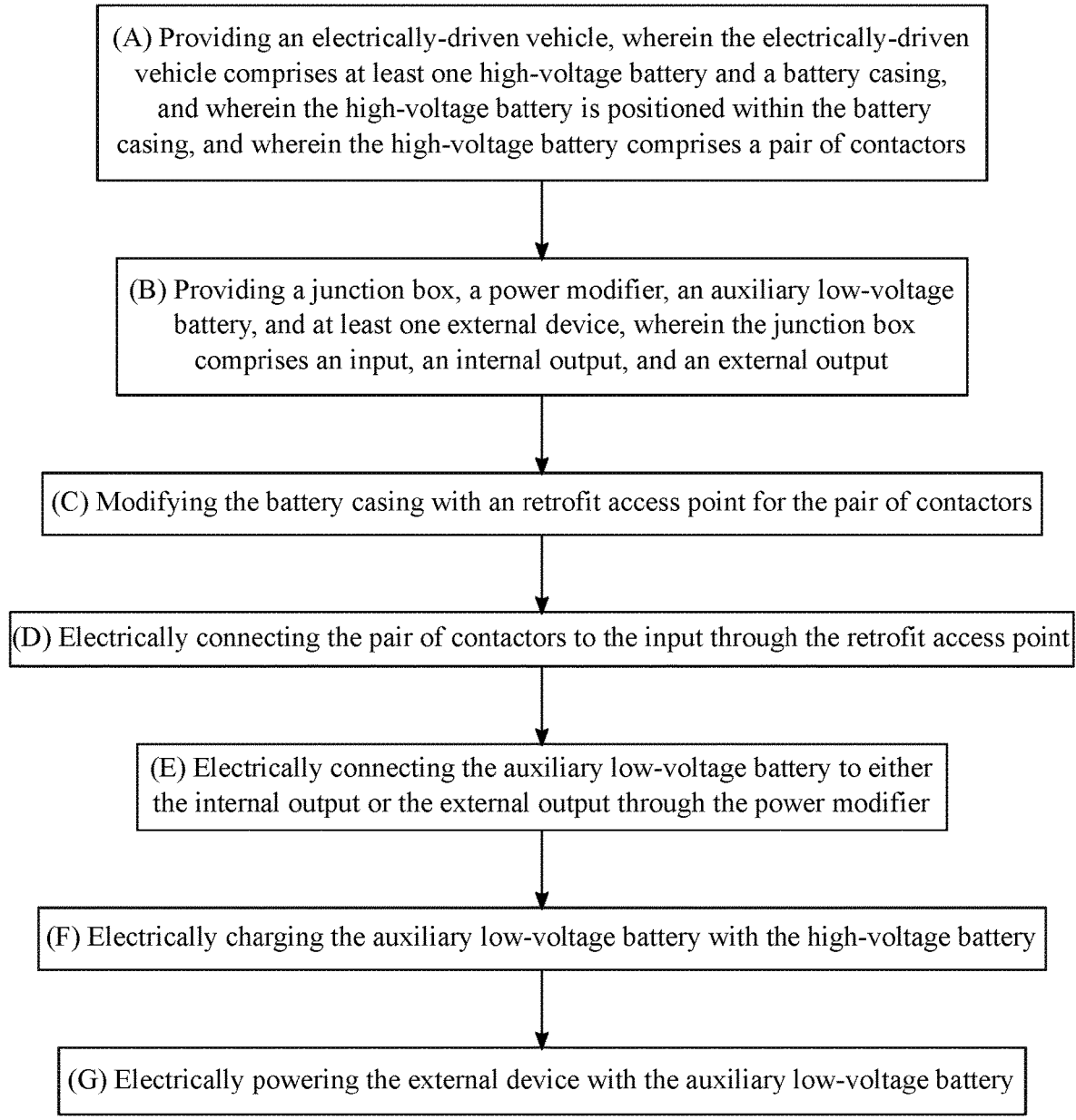
FIG. 2 is a flowchart illustrating the overall method of the present invention.

In reference to FIGS. 1 to 24, the present invention is a system and method of powering an external device with a vehicular battery system. The system allows a user to easily draw power from a vehicular battery system in order to power external electrical devices. The power is drawn in a unilateral direction eliminating the need to communicate with a vehicle's onboard electronic control unit (ECU). With reference to FIGS. 1A, 1B, and 2, the system is provided with an electrically-driven vehicle (Step A). The electrically-driven vehicle is preferably a hybrid vehicle that uses an internal combustion engine and an electrical power source. Further, the electrically-driven vehicle may be a vehicle with a high-voltage battery source such as, but not limited to, a Tesla type vehicle. The electrically-driven vehicle comprises at least one high-voltage battery and a battery casing. The high-voltage battery is positioned within the battery casing. The high-voltage battery comprises a pair of contactors. The high-voltage battery is said electrical power source of the electrically-driven vehicle. The battery casing is used to protect and conceal the high-voltage battery. The pair of contactors is used to carry and distribute current from the high-voltage battery. In the preferred embodiment of the present invention, the system is used to draw direct current (DC) from the high-voltage battery through the pair of contactors. The system is provided with a junction box, a power modifier, an auxiliary low-voltage battery, and at least one external device (Step B). The junction box comprises an input derived from the pair of contactors, an internal output for on-vehicle charging, and an external output for off-vehicle charging. The junction box is used to provide multiple options to connect the auxiliary low-voltage battery to the high-voltage voltage battery. The power modifier is a single device or a combination of devices which is used to modify the high-voltage DC drawn from the high-voltage battery in order for the auxiliary low-voltage to be safely charged. The auxiliary low-voltage battery is used to store power that is drawn from the high-voltage battery. The external device may be any electrically-powered device that is powered by the auxiliary low-voltage battery.

With reference to FIG. 2, the method of the present invention follows an overall process in order to power the external device with a vehicular battery system. Firstly, the battery casing is modified with a retrofit access point for the pair of contactors (Step C). In further detail, the battery casing is pierced to make the retrofit access point. Various tools can be used to pierce the battery casing. Thus, the pair of contactors can be accessed in order to draw a high-voltage DC from the high-voltage battery. The pair of contactors is connected to the input through the retrofit access point (Step D). This step establishes an electrical connection from the high-voltage battery, through the access point, and to the junction box. The auxiliary low-voltage battery is electrically connected to either the internal output or the external output through the power modifier (Step E). This step establishes an electrical connection from the high-voltage battery to the auxiliary low-voltage battery through the junction box. Further, the internal output is used when the electrically-driven vehicle is being operated, and the external output is used when the electrically-driven vehicle is in park. The high-voltage battery is used to electrically charge the auxiliary low-voltage battery (Step F). Thus, the auxiliary low-voltage battery can store electrical energy that is drawn from the high-voltage battery. The auxiliary low-voltage battery is used to electrically power the external device (Step G). Therefore, the external device is powered by the high-voltage battery through the auxiliary low-voltage battery.

Figure 3:
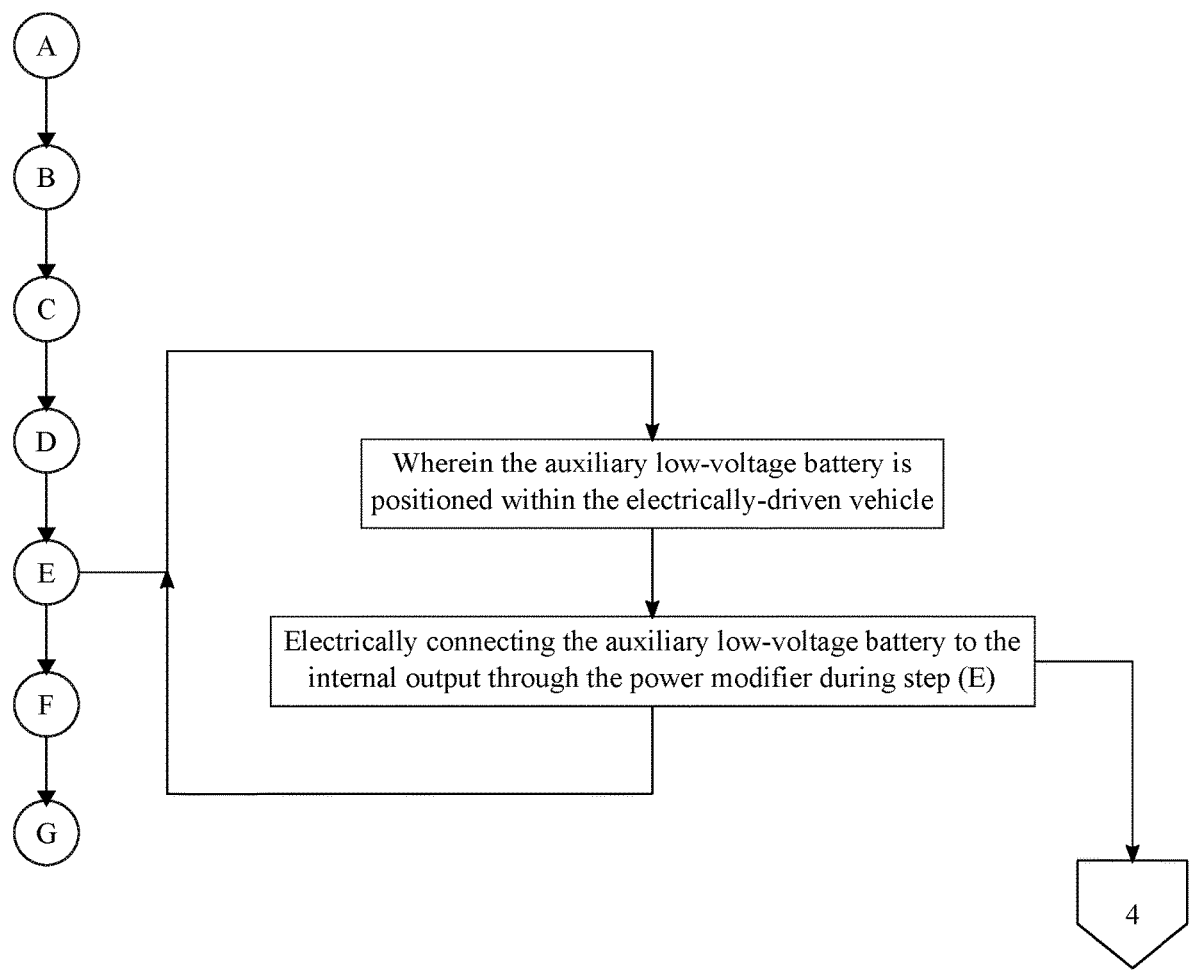
FIG. 3 is a flowchart illustrating the subprocess of on-vehicle charging of the auxiliary low-voltage battery.
Figure 4:
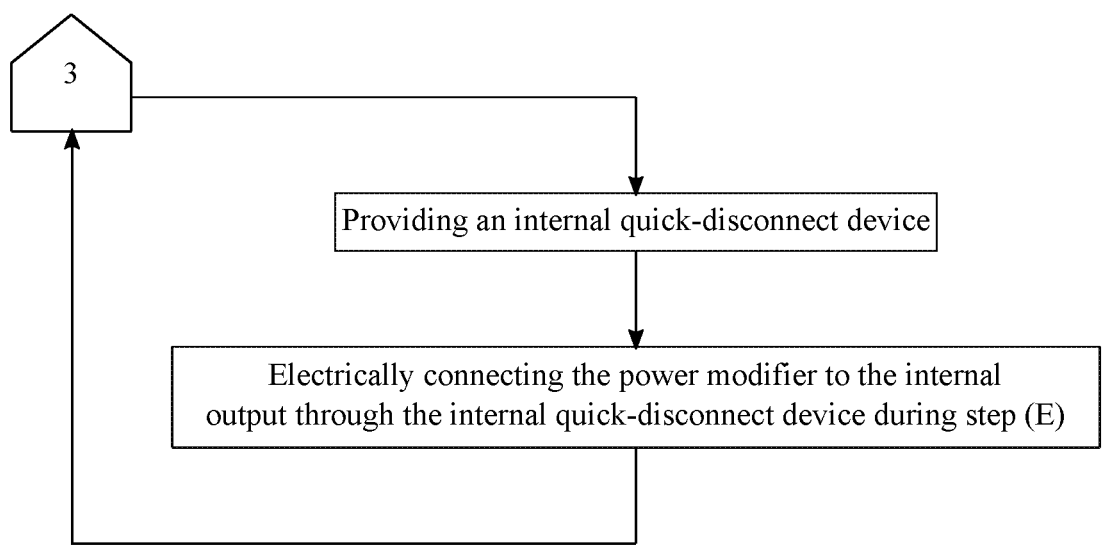
FIG. 4 is a flowchart illustrating the subprocess of connecting the auxiliary low-voltage battery to the junction box through the internal quick-disconnect device.

In one embodiment of the present invention where the electrically-driven vehicle is being operated and with reference to FIGS. 1A, 3, and 4, the auxiliary low-voltage battery is positioned within the electrically-driven vehicle. The auxiliary low-voltage battery is electrically connected to the internal output through the power modifier during Step E. Thus, the auxiliary low-voltage battery may be charged when the electrically-driven vehicle is being operated. Moreover, the system may further be provided with an internal quick-disconnect device. The internal quick-disconnect device is used to establish a safe and efficient electrical connection between the junction box and the auxiliary low-voltage battery. Further, the internal quick-disconnect device allows a user to selectively connect or disconnect the auxiliary low-voltage battery to and from the junction box when desired. The power modifier is electrically connected to the internal output through the internal quick-disconnect device during Step E. Thus, the high-voltage battery can charge the auxiliary low-voltage battery when the electrically-driven vehicle is being operated.

Figure 5:
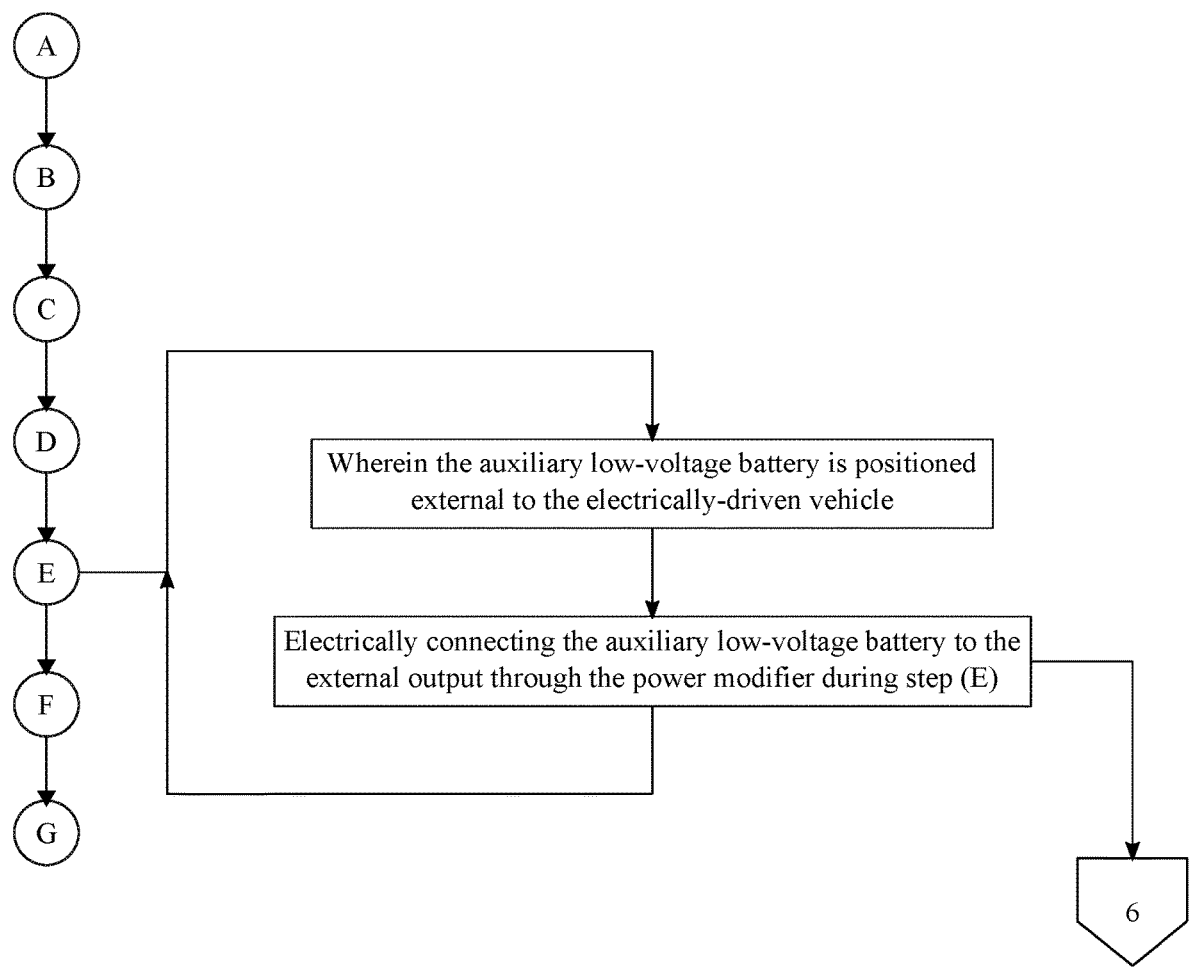
FIG. 5 is a flowchart illustrating the subprocess of off-vehicle charging of the auxiliary low-voltage battery.
Figure 6:
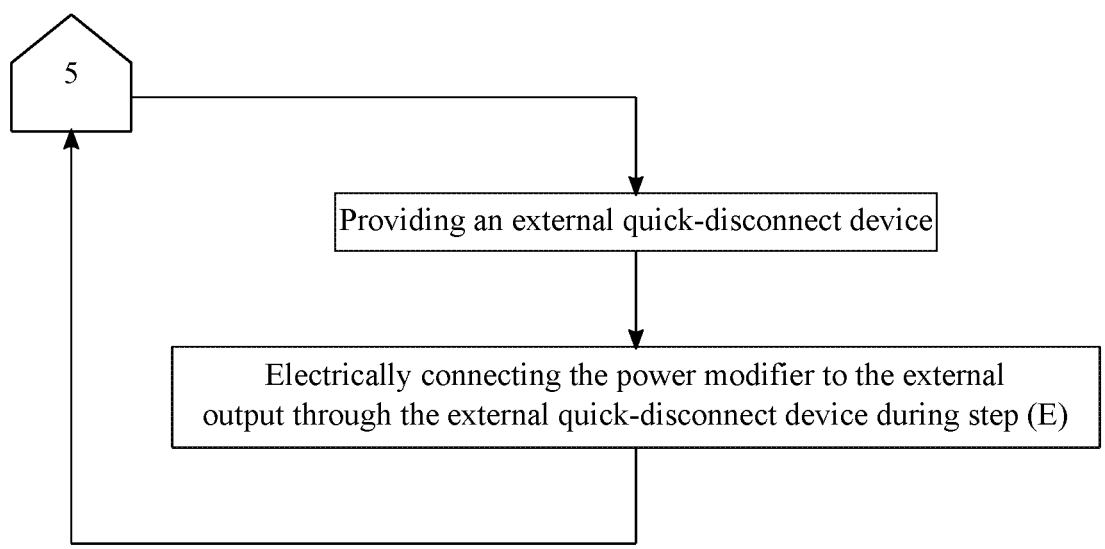
FIG. 6 is a flowchart illustrating the subprocess of connecting the auxiliary low-voltage battery to the junction box through the external quick-disconnect device.

In another embodiment of the present invention where the electrically-driven vehicle is in park and with reference to FIGS. 1B, 5, and 6, the auxiliary low-voltage battery is positioned external to the electrically-driven vehicle. The electrically-driven vehicle must be modified in order to provide an access point for the external output. In further detail, an access point to connect to external output must be created through the body panel of the electrically-driven vehicle. The auxiliary low-voltage battery is electrically connected to the external output through the power modifier during Step E. Thus, the auxiliary low-voltage battery may be charged when the electrically-driven vehicle is in park. Moreover, the system may further be provided with an external quick-disconnect device. Similar to the internal quick-disconnect device, the external quick-disconnect device is used to establish a safe and efficient electrical connection between the junction box and the auxiliary low-voltage battery. Additionally, the external quick-disconnect device allows a user to selectively connect or disconnect the auxiliary low-voltage battery to and from the junction box when desired. The power modifier is electrically connected to the external output through the external quick-disconnect device during Step E. Thus, the high-voltage battery can charge the auxiliary low-voltage battery when the electrically-driven vehicle is in park. The transfer of power from the high-voltage battery to the auxiliary low-voltage battery allows for lower amperages. The low amperage further allows for greater distance charging utilizing smaller diameter wiring, rather than directly inverting DC to AC power while onboard which would require higher amperage currents for power transfer.

Figure 7:
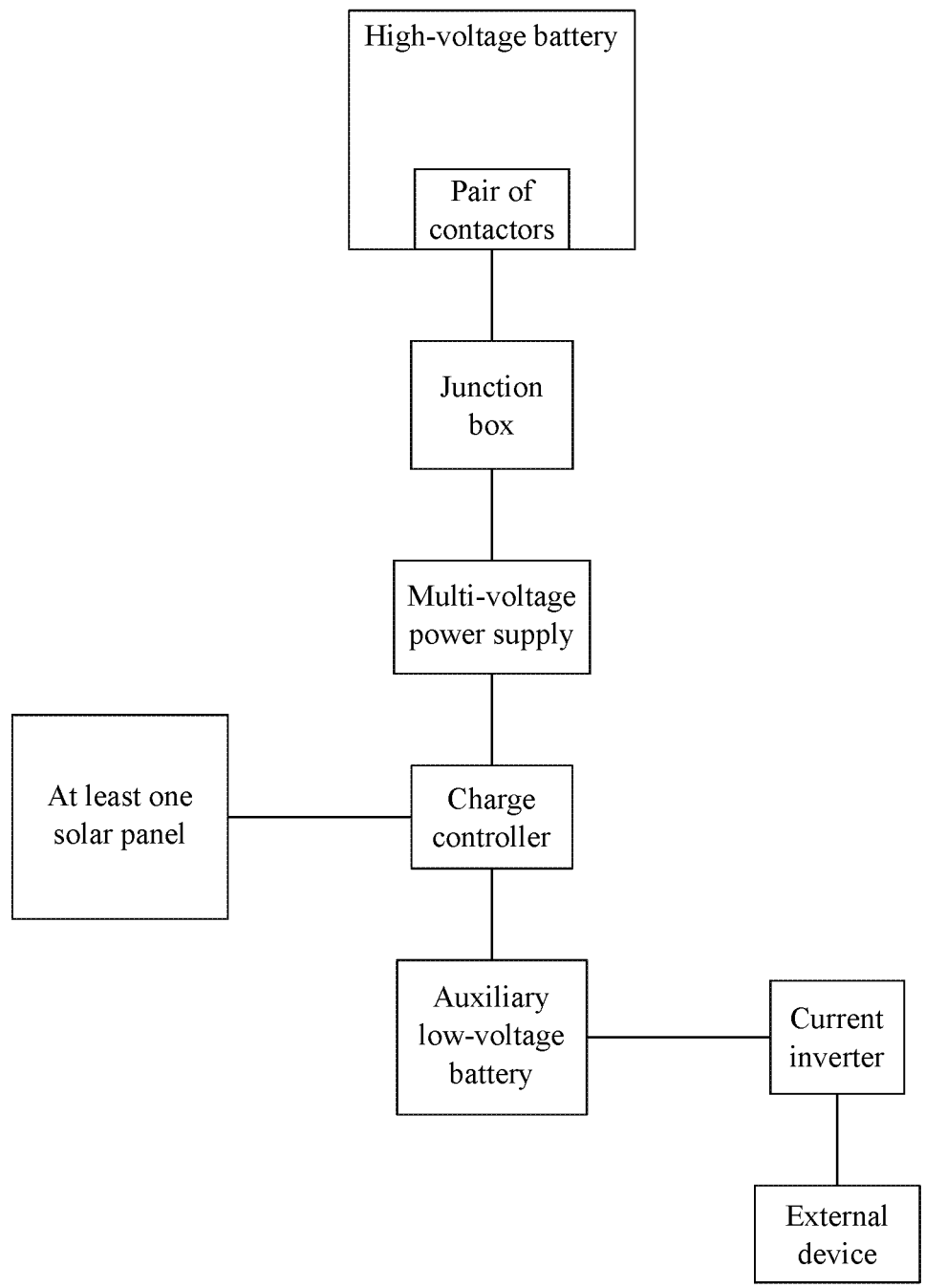
FIG. 7 is a block diagram illustrating one embodiment of the system with the multi-voltage power supply and the charge controller.
Figure 8:
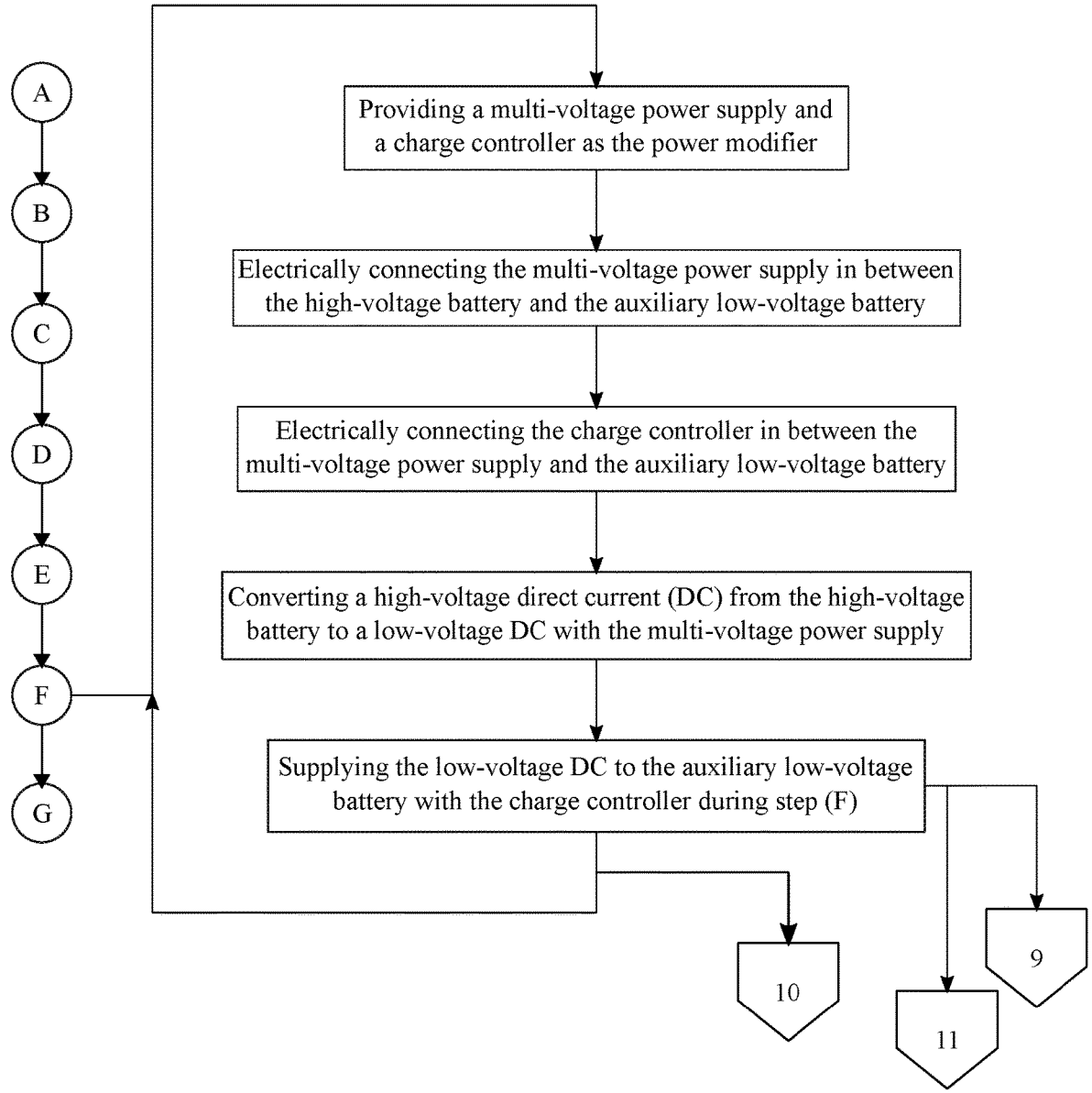
FIG. 8 is a flowchart illustrating the subprocess of charging the auxiliary low-voltage battery using the multi-voltage power supply and the charge controller.

With reference to FIGS. 7 and 8, the system is provided with a multi-voltage power supply and a charge controller as the power modifier. The multi-voltage power supply is preferably a power supply that employs rectification, power switching, pulse width modulation (PWM), and power factor correction (PFC) control. Furthermore, the multi-voltage power supply must have the ability to convert high-voltage DC to low-voltage DC. The charge controller is preferably a computerized controller that can automatically sense the voltage of the auxiliary low-voltage battery and precisely supply the corrected, graduated current and voltage to the auxiliary low-voltage battery. The multi-voltage power supply is electrically connected in between the high-voltage battery and the auxiliary low-voltage battery. This allows the multi-voltage power supply to convert the high-voltage DC from the high-voltage battery before being used to charge the auxiliary low-voltage battery. The charge controller is electrically connected in between the multi-voltage power supply and the auxiliary low-voltage battery. This allows the charge controller to supply a safe current and voltage to the auxiliary low-voltage battery after the high-voltage is converted by the multi-voltage power supply. The multi-voltage power supply is used to convert a high-voltage DC from the high-voltage battery to a low-voltage DC. Thus, the DC from the high-voltage battery is safe to be received by the auxiliary low-voltage battery. The charge controller is used to supply the low-voltage DC to the auxiliary low-voltage battery during Step F. Thus, the corrected, graduated current and voltage is safely supplied to the auxiliary low-voltage battery.

In further detail, the multi-voltage power supply is an appropriately sized power supply such as, but not limited to, a Meanwell DPU-3200 power supply. The charge controller can be a standard, less expensive charge controller such as, but not limited to, a 150-volt, 70-amp charge controller. Off-grid installations currently utilize existing charge controllers to charge various sized battery banks via solar power. These systems have need for backup power utilizing less efficient fossil fuel generators. These systems can utilize the multi-voltage power supply, connected at the extreme end of a feed wire from the external output. Thereby, 300 volts of DC power at 10.6 amps (3200 Watts), for example, can be delivered over a longer distance, rather than 120 volts AC at 26.6 amps for example, utilizing thinner wire cabling. The high-voltage DC power can then be connected to the multi-voltage power supply. The high-voltage DC power is then converted to lower-voltage DC power which can then be connected to an appropriately that charge controller that is appropriately sized such as, but not limited to, 48 volts at 67 amps to charge the auxiliary low-voltage battery. Depending on the size of the auxiliary low-voltage battery being charged, the maximum output power is almost unlimited. The final inverted power output can be massive such as, but not limited to, 3000 watts to 20,000 watts or higher. The charged auxiliary low-voltage battery output is only limited by the size of the auxiliary low-voltage battery. The electrically-driven vehicle in this instance must be in park with the engine operating. Hybrid vehicle are designed to operate more efficiently than standard internal combustion engines (ICE) generators as they are automatically designed to power on and off to adjust automatically to power load requirements.

Figure 9:
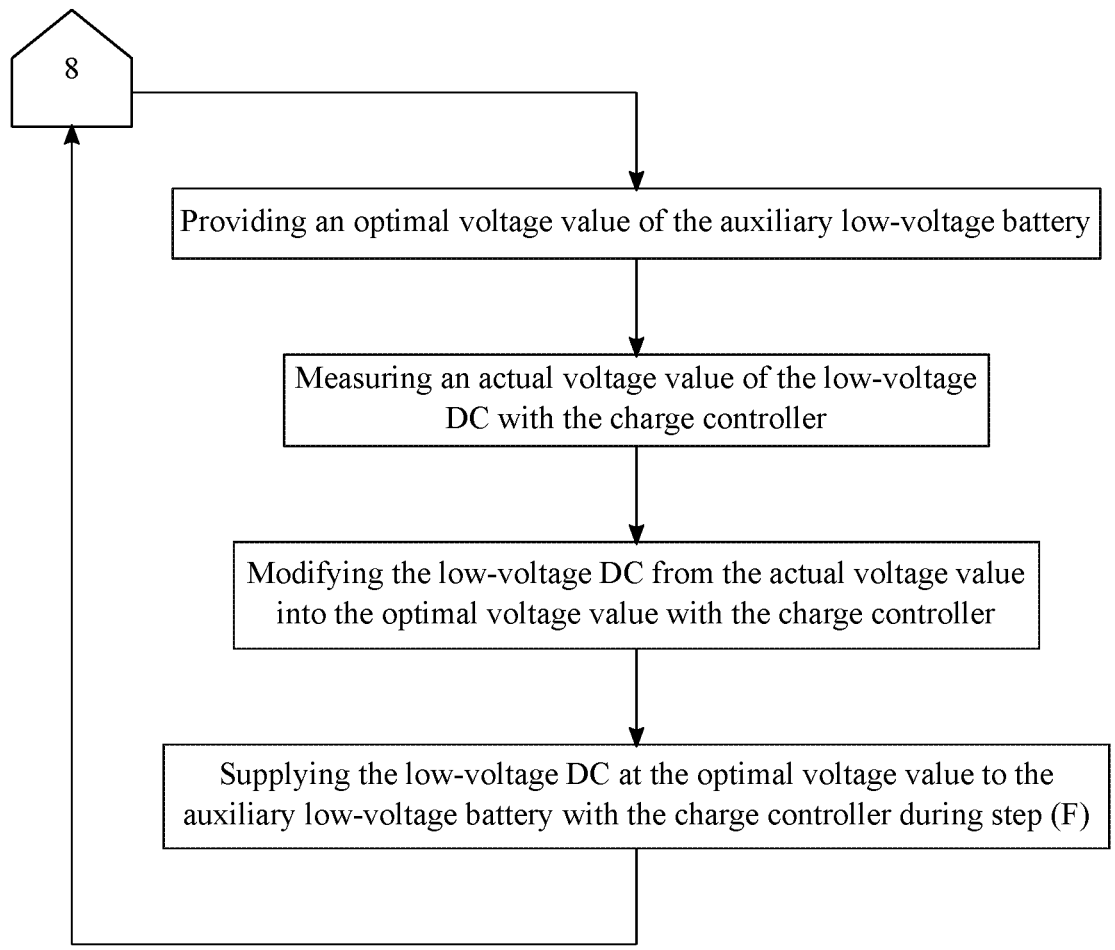
FIG. 9 is a flowchart illustrating the subprocess of charging the auxiliary low-voltage battery at the optimal voltage value with the high-voltage battery.

With reference to FIG. 9, the system is provided with an optimal voltage value of the auxiliary low-voltage battery. The optimal voltage value is the most efficient voltage that can be received by the auxiliary low-voltage battery. The charge controller is used to measure an actual voltage value of the low-voltage DC. The actual voltage value is a raw voltage measurement of the low-voltage DC converted by the multi-voltage power supply. The charge controller is used to modify the low-voltage DC from the actual voltage value into the optimal voltage value. This step ensures the low-voltage DC is safe to be received by the auxiliary low-voltage battery. The charge controller is used to supply the low-voltage DC at the optimal voltage value to the auxiliary low-voltage battery during Step F. Thus, the auxiliary low-voltage battery is efficiently and safely charged by the high-voltage battery.

Figure 10:
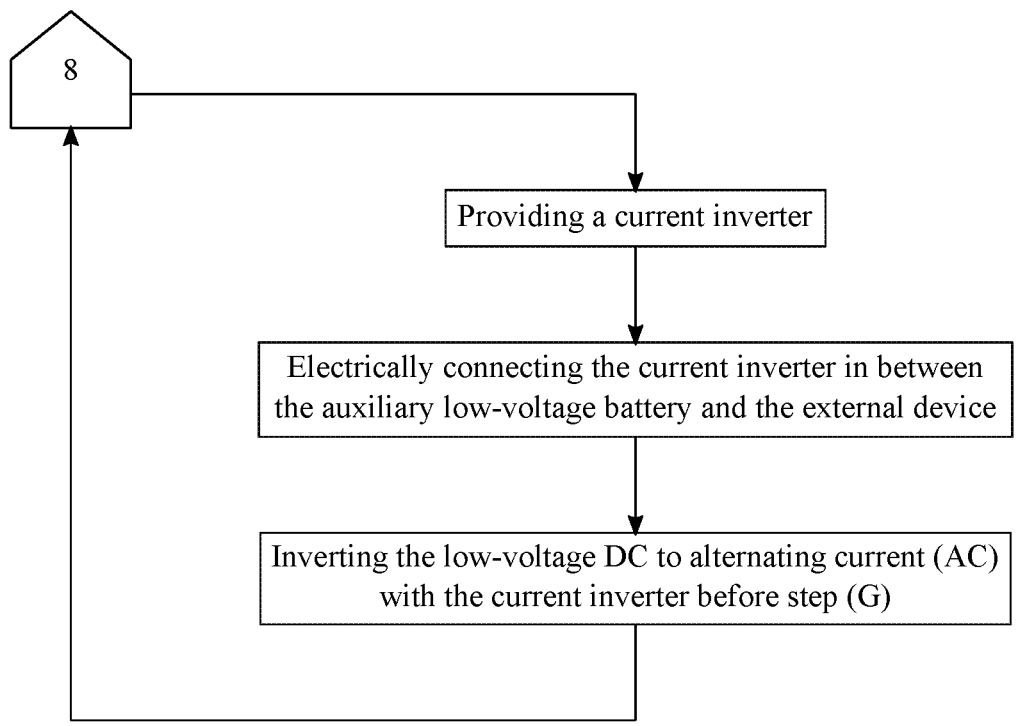
FIG. 10 is a flowchart illustrating the subprocess of inverting DC to AC with the current inverter.

With reference to FIGS. 7 and 10, the system is further provided with a current inverter. The current inverter may be any inverter device able to invert DC to AC or vise versa. The current inverter is electrically connected in between the auxiliary low-voltage battery and the external device. This allows the current inverter to invert the DC stored by the auxiliary low-voltage battery before the auxiliary low-voltage batter is used to power the external device. The current inverter is used to invert the low-voltage DC to alternating current (AC) before Step G. Thus, the external device can be efficiently and safely powered by the auxiliary low-voltage battery.

Figure 11:
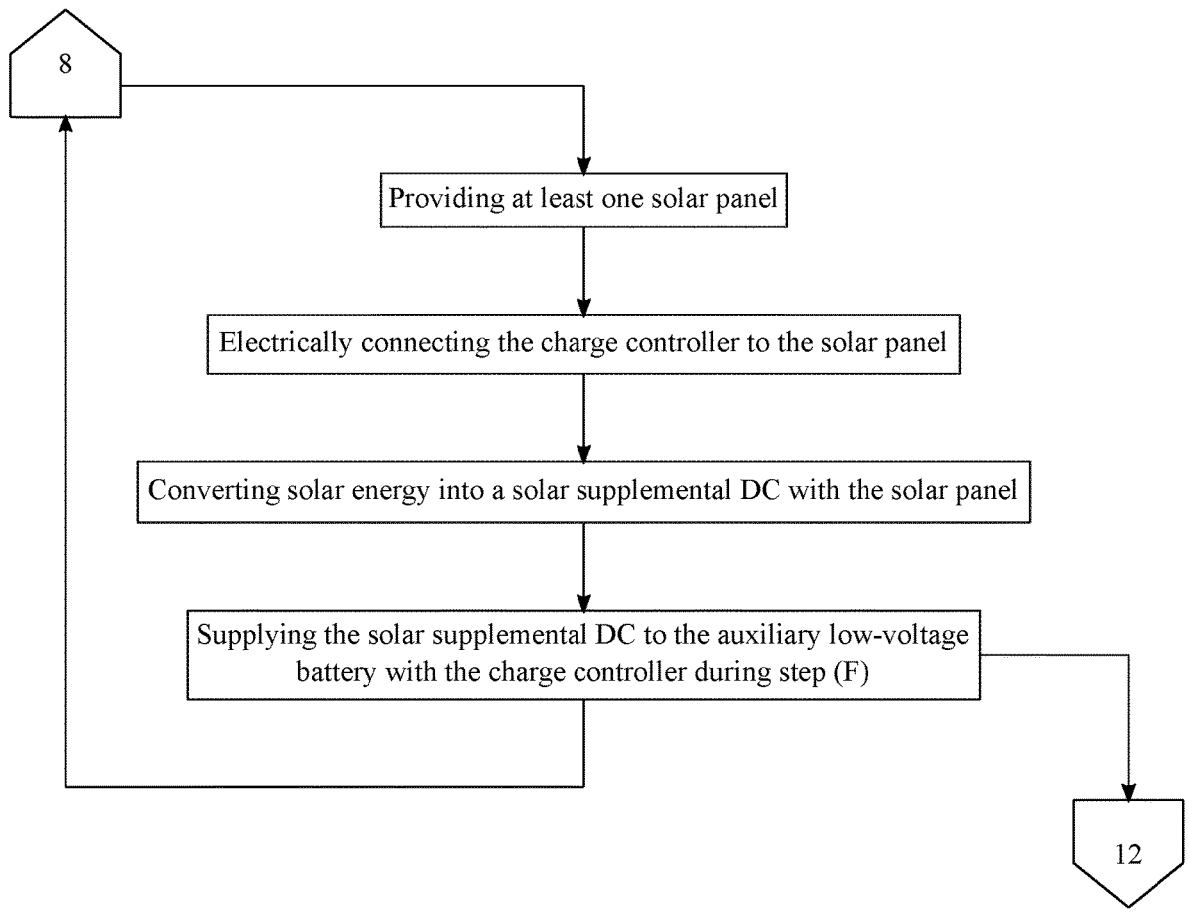
FIG. 11 is a flowchart illustrating the subprocess of using the solar panel to charge the auxiliary low-voltage battery.
Figure 12:
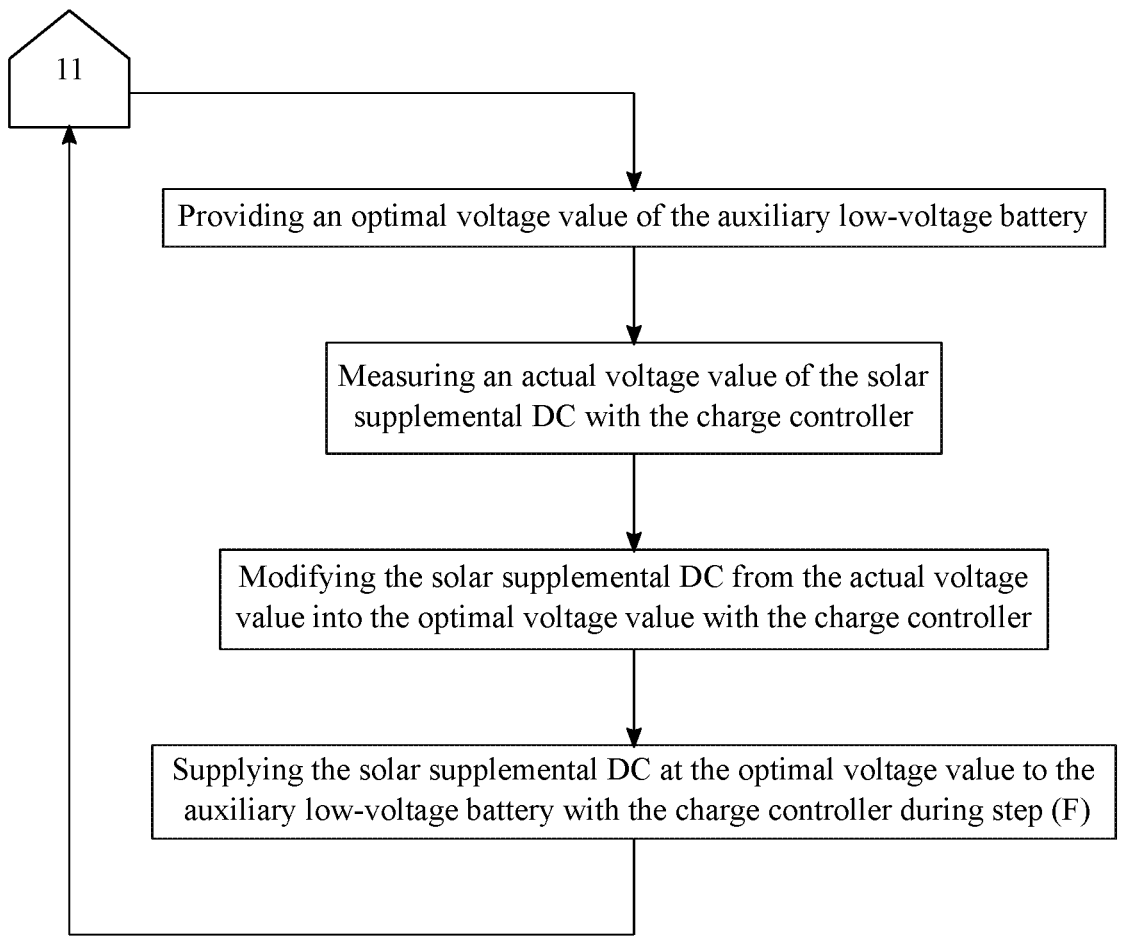
FIG. 12 is a flowchart illustrating the subprocess of charging the auxiliary low-voltage battery at the optimal voltage value with the solar panel.

In another embodiment of the present invention and with reference to FIGS. 7 and 11, the system is further provided with at least one solar panel. The solar panel is used to aid in charging the auxiliary low-voltage battery. The charge controller is electrically connected to the solar panel. This allows energy to be drawn from the solar panel with the charge controller. Further, the charge controller is preferably a computerized solar charge controller. The solar panel is used to convert solar energy into a solar supplemental DC. Thus, electrical energy is supplied to the charge controller before used to charge the auxiliary low-voltage battery. The charge controller is used to supply the solar supplemental DC to the auxiliary low-voltage battery during Step F. This allows the auxiliary low-voltage battery to be charged by both the high-voltage battery and the solar panel.

As mentioned before and with refence to FIG. 12, the system is provided with an optimal voltage value of the auxiliary low-voltage battery. The optimal voltage value is the most efficient voltage that can be received by the auxiliary low-voltage battery. The charge controller is used to measure an actual voltage value of the solar supplemental DC with the charge controller. The actual voltage value is a raw voltage measurement of the solar supplemental DC supplied by the solar panel. The charge controller is then used to modify the solar supplemental DC from the actual voltage value into the optimal voltage value. This ensures that the solar supplemental DC is safe to charge the auxiliary low-voltage battery. The charge controller is then used to the supply the solar supplemental DC at the optimal voltage value to the auxiliary low-voltage battery during Step F. Thus, the auxiliary low-voltage battery is efficiently and safely charged by the solar panel.

Figure 13:
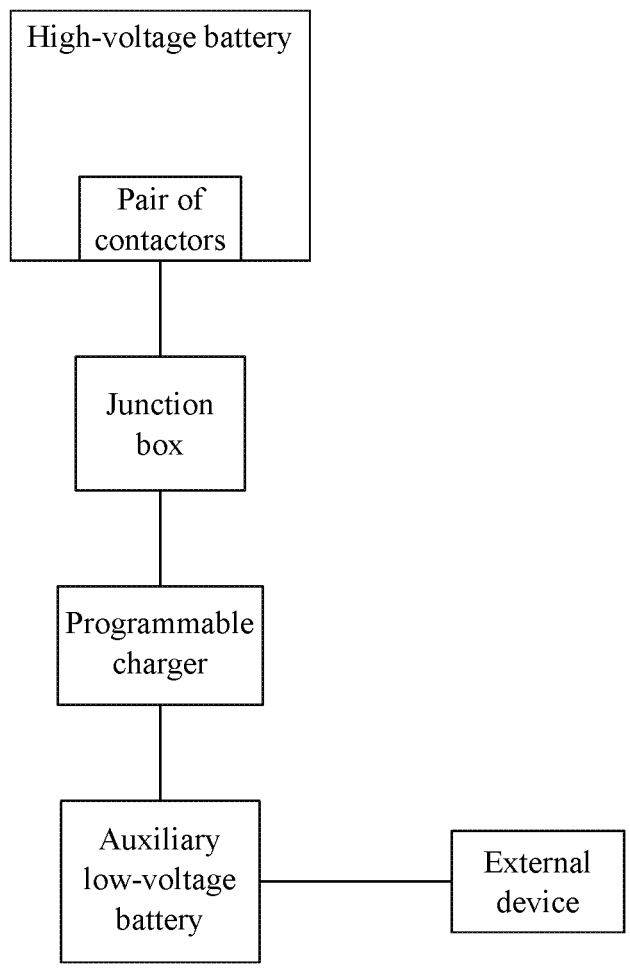
FIG. 13 is a block diagram illustrating another embodiment of the system.
Figure 14:
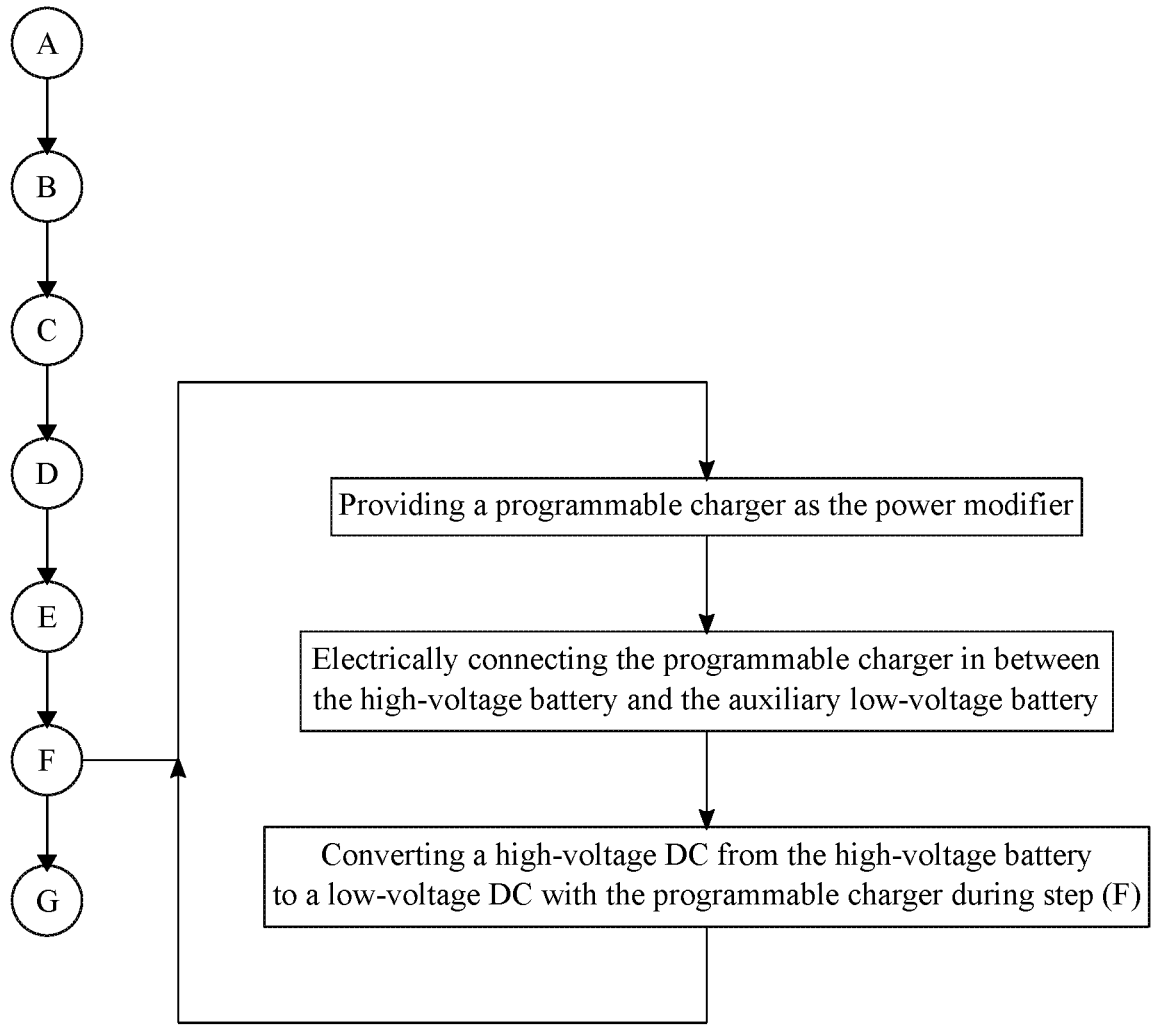
FIG. 14 is a flowchart illustrating the subprocess of charging the auxiliary low-voltage battery using the current converter.

In another embodiment and with reference to FIGS. 13 and 14, the system is provided with a programmable charger as the power modifier. Similar to the multi-voltage power supply, the programable charger is able to convert a high-voltage DC into a low-voltage DC. The programmable charger is used instead of the multi-voltage power supply and the charge controller. Moreover, the programmable charger is a high-voltage input, low-voltage output charger such as, but not limited to, a DBU-3200-48 charger. Therefore, the programmable charger is programmable for various charge curves and can be used with various battery types. The programmable charger is electrically connected in between the high-voltage battery and the auxiliary low-voltage battery. This allows the programmable charger to convert the DC drawn from the high-voltage battery before being used to charge the auxiliary low-voltage battery. The programable charger is used to convert a high-voltage DC from the high-voltage battery to a low-voltage DC during Step F. Thus, the DC from the high-voltage battery is safe for charging the auxiliary low-voltage battery.

Figure 15:
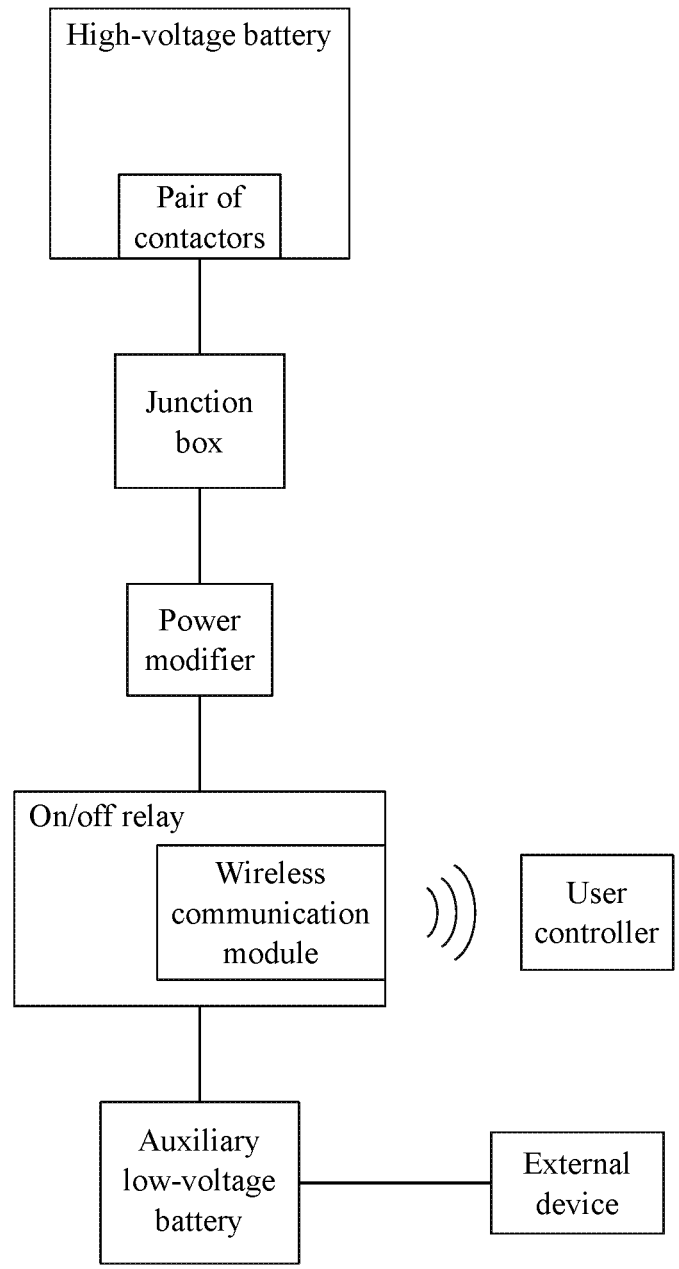
FIG. 15 is a block diagram illustrating the system with the on/off relay.
Figure 16:
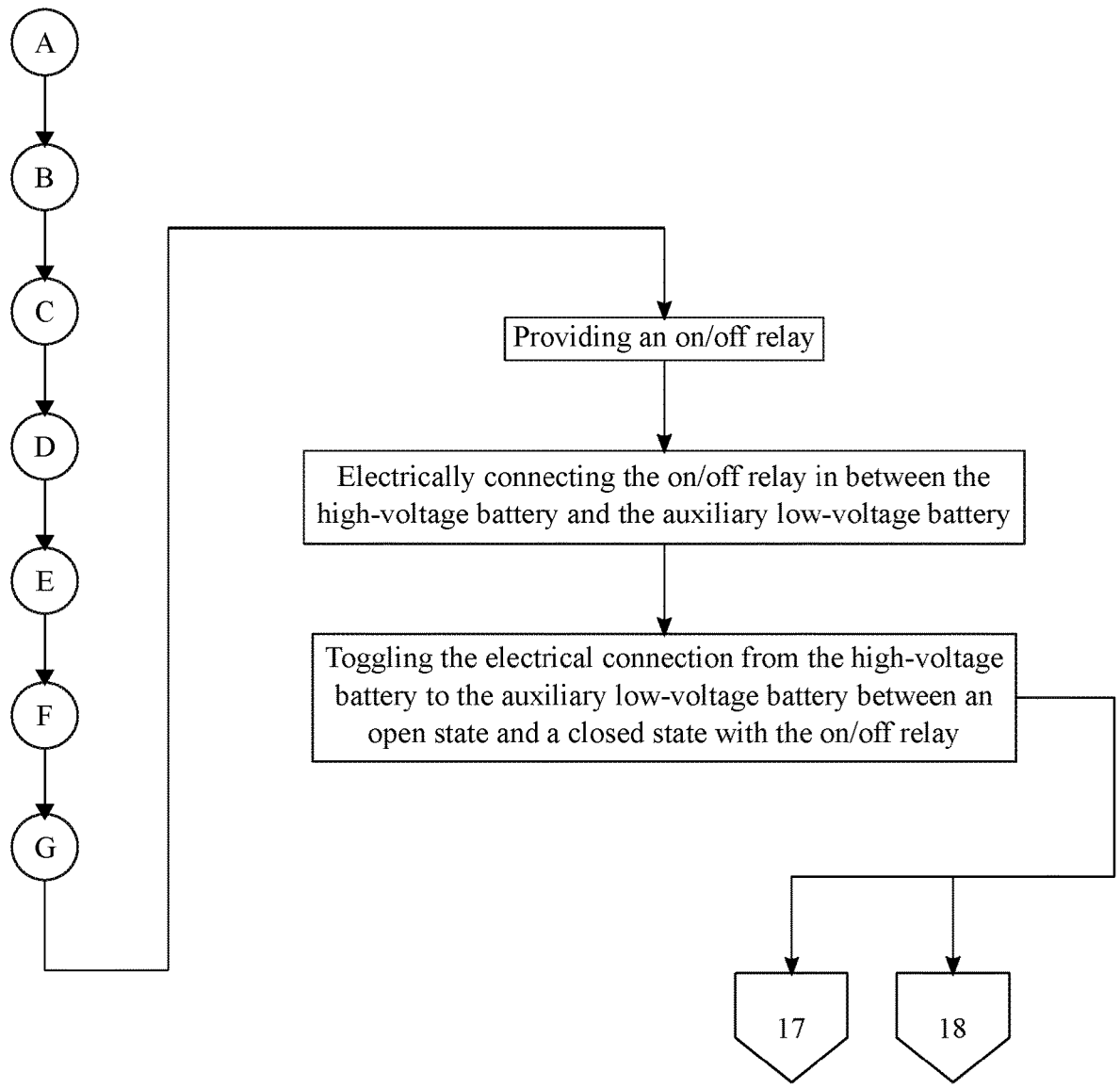
FIG. 16 is a flowchart illustrating the subprocess of turning the system on or off with the relay.

With reference to FIGS. 15 and 16, the system may be further provided with an on/off relay. The on/off relay allows a user to remotely turn the system on or off when desired. The on/off relay is electrically connected in between the high-voltage battery and the auxiliary low-voltage battery. This creates a circuit between the high-voltage battery and the auxiliary low-voltage battery through the on/off relay. The on/off relay can then be used to toggle the electrical connection from the high-voltage battery to the auxiliary low-voltage battery between an open state and a closed state. The open state is the off state of the system, and the closed state is the on state of the system. Thus, the user can remotely turn the system on or off through the on/off relay.

Figure 17:
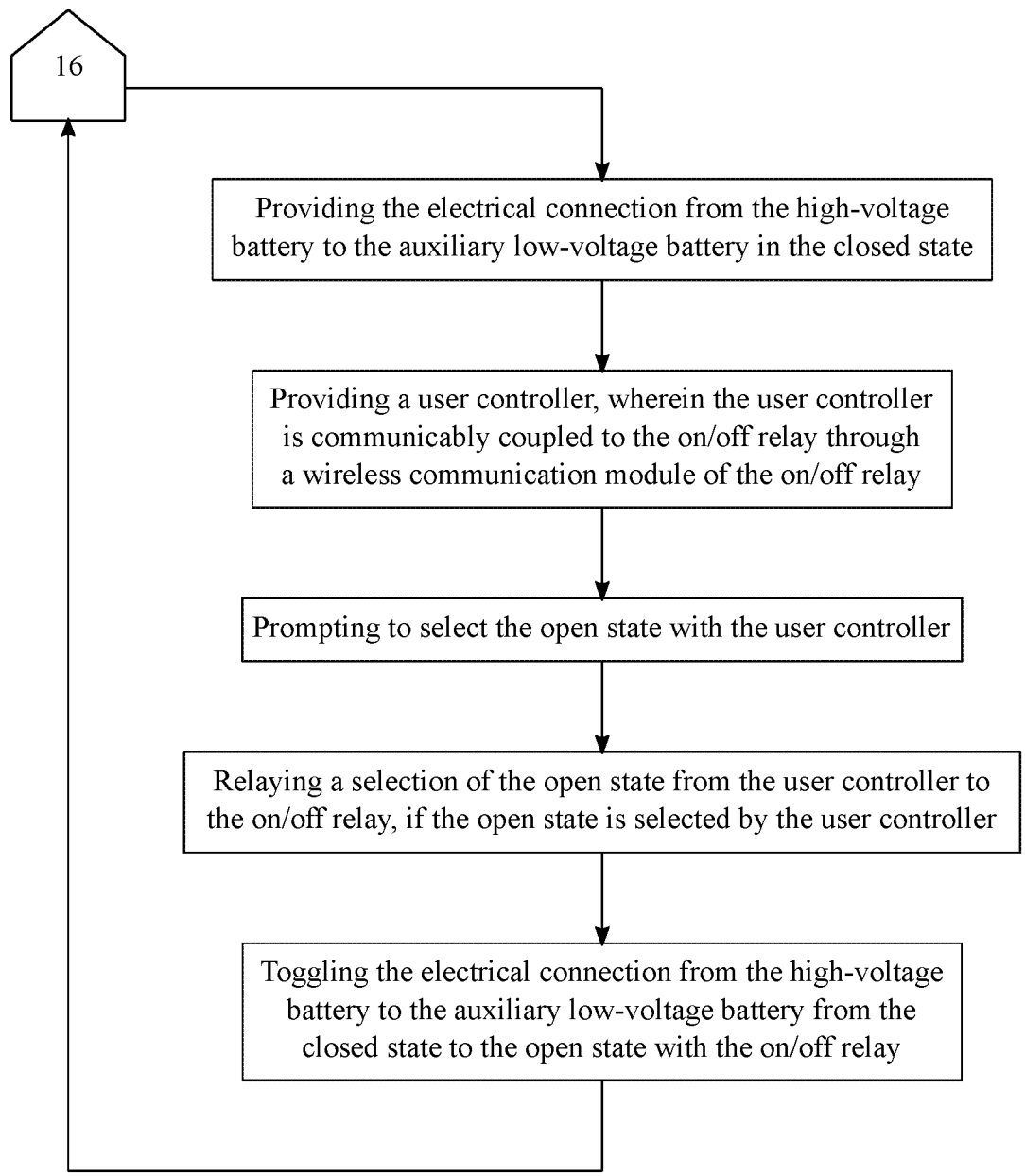
FIG. 17 is a flowchart illustrating the subprocess of using the user controller to specifically turn off the system.

With refence to FIG. 17, the system may further be provided with a user controller. The user controller is communicably coupled to the on/off relay through a wireless communication module of the on/off relay. The user controller may be any computing device such as, but not limited, a remote-control device, a mobile smartphone, a desktop computer, or a portable computer. The wireless communication module may be any type of wireless communication device such as, but not limited, a Bluetooth device, or Wi-Fi device. If the electrical connection from the high-voltage battery to the auxiliary low-voltage batter is in the closed state, then the user controller is used to prompt to select the open state. This provides a user the option to turn the system off through the user controller. The selection of the open state is relayed from the user controller to the on/off relay, if the open state is selected by the user controller. The on/off relay is then used to toggle the electrical connection from the high-voltage battery to the auxiliary low-voltage battery from the closed state to the open state. Thus, the system is turned off by an input of a user through the user controller.

Figure 18:
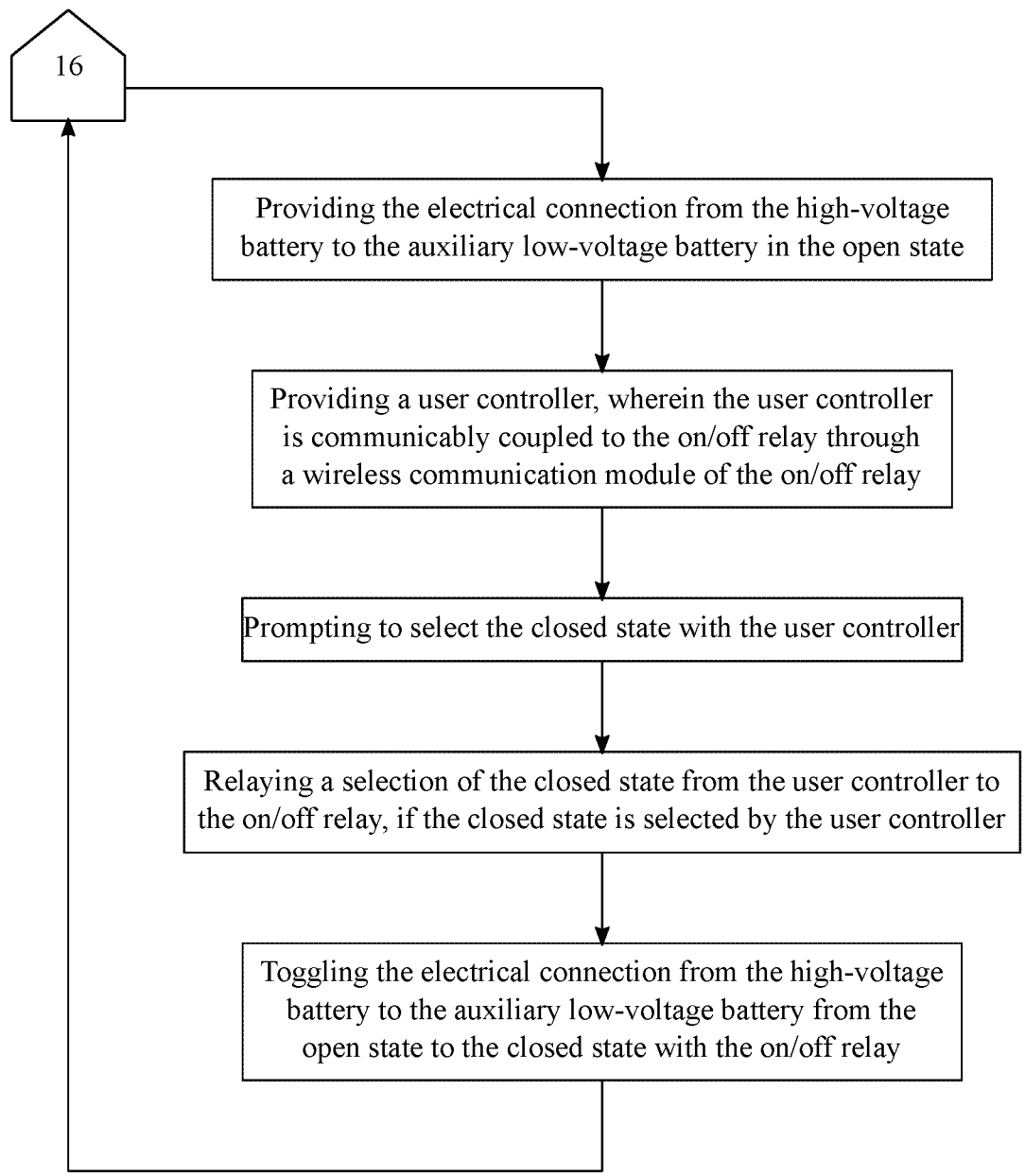
FIG. 18 is a flowchart illustrating the subprocess of using the user controller to specifically turn on the system.

Alternatively and with reference to FIG. 18, if the electrical connection from the high-voltage battery to the auxiliary low-voltage battery is in the open state, then the user controller is used to prompt to select the closed state. This provides a user the option to turn the system on through the user controller. The selection of the closed state is relayed from the user controller to the on/off relay, if the closed state is selected by the user controller. The on/off relay is then used to toggle the electrical connection from the high-voltage battery to the auxiliary low-voltage battery from the open state to the closed state. Thus, the system is turned on by an input of a user through the user controller.

Figure 19:
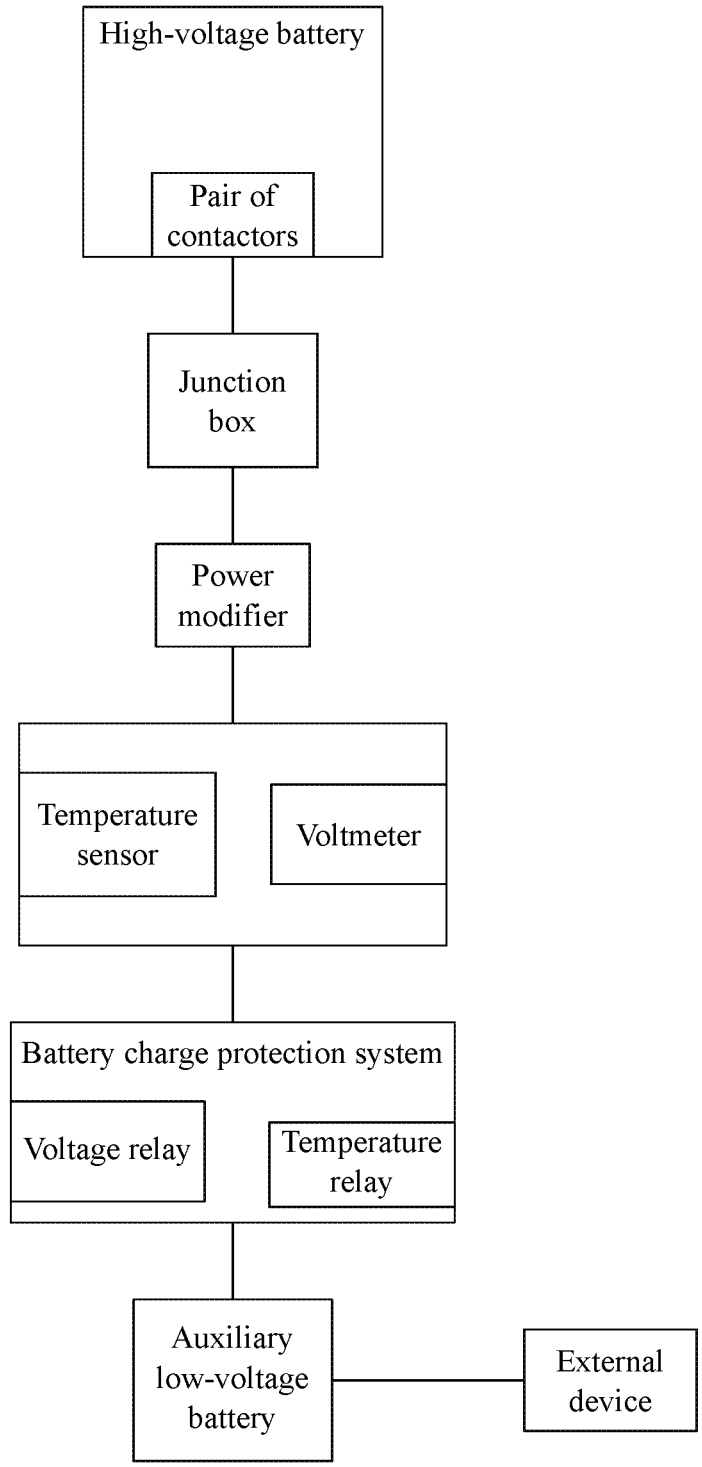
FIG. 19 is a block diagram illustrating the system with the battery charge protection system.
Figure 20:
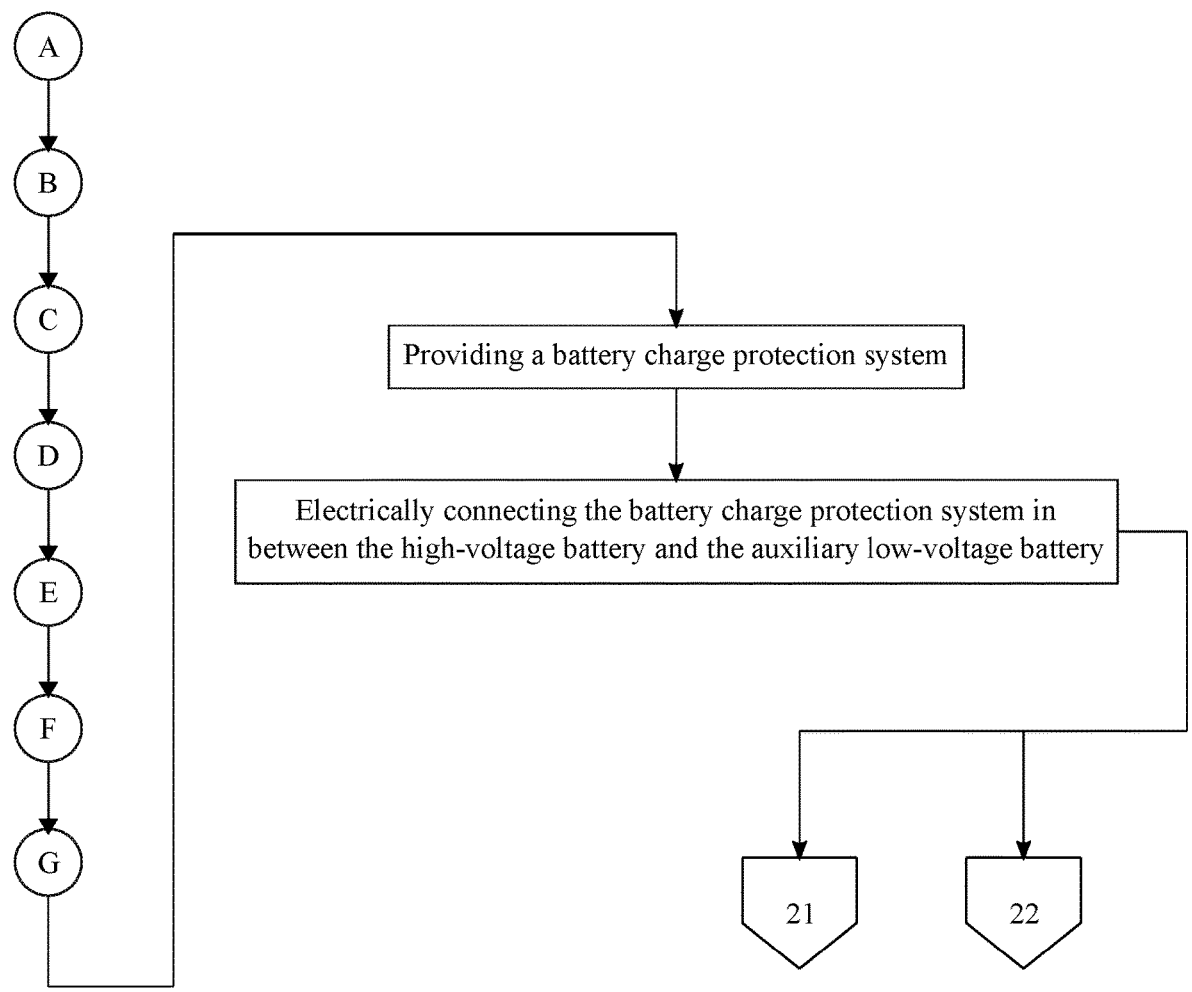
FIG. 20 is a flowchart illustrating the subprocess of integrating the battery charge protection to the system.

With reference to FIGS. 19 and 20, the system may further be provided with a battery charge protection system. The battery charge protection system is used to protect the circuit of the system thereby protection the electrical components of the system. The battery charge protection system is electrically connected in between the high-voltage battery and the auxiliary low-voltage battery. Thus, the high-voltage battery and the auxiliary low-voltage battery are protected by the battery charge protection system.

Figure 21:
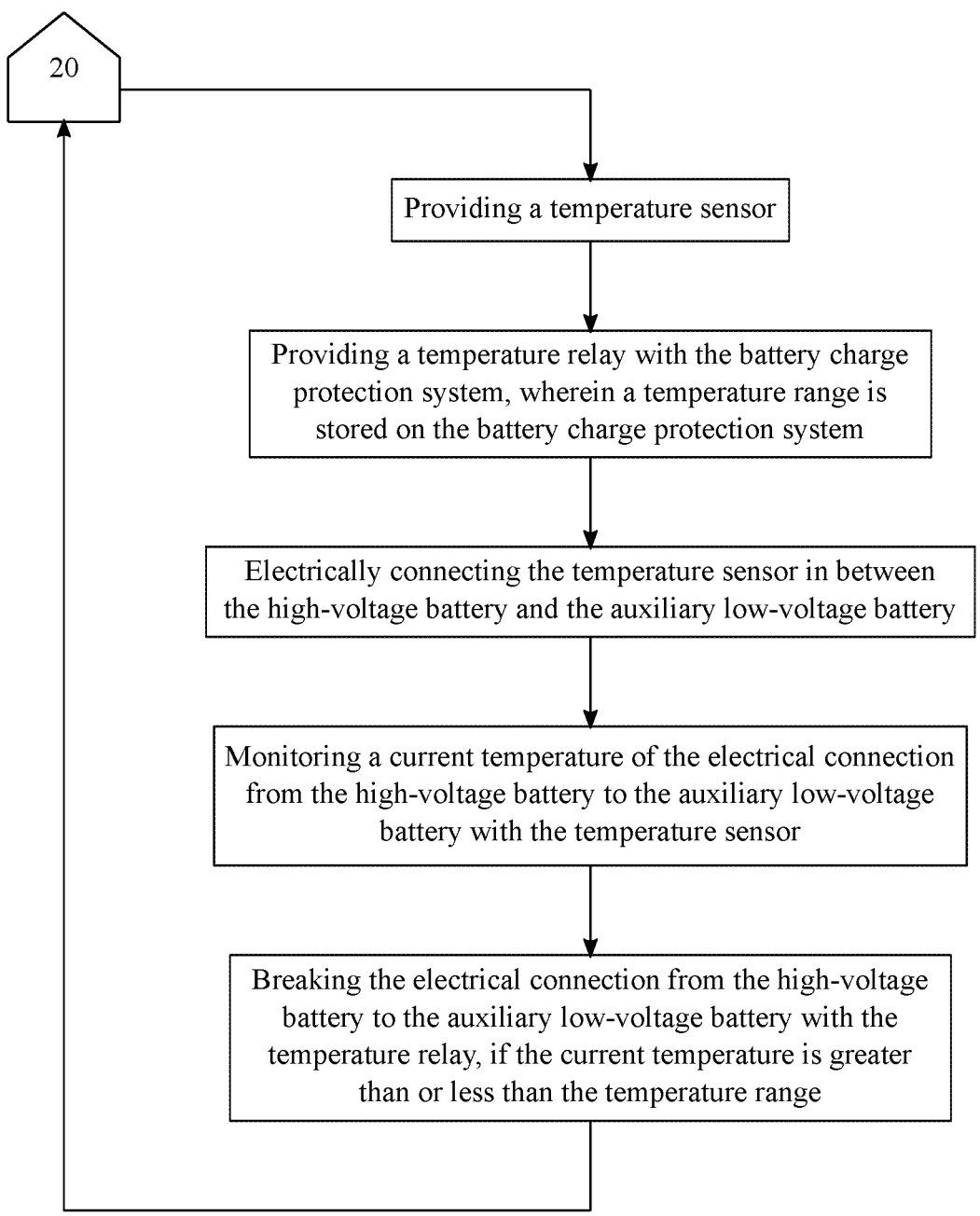
FIG. 21 is a flowchart illustrating the subprocess of breaking the electrical connection of the system with the temperature relay.

With reference to FIGS. 19 and 21, the system may further be provided with a temperature sensor. The temperature sensor is used to measure the temperature of the system. Further, a temperature relay is provided with the battery charge protection system. A temperature range is stored on the battery charge protection system. The temperature range is a specific range of temperature where the operation of the system is safe and efficient. For the temperature sensor to accurately measure the temperature of the system, the temperature sensor is electrically connected in between the high-voltage battery and the auxiliary low-voltage battery. The temperature sensor is used to monitor a current temperature of the electrical connection from the high-voltage battery to the auxiliary low-voltage battery. The current temperature is a live temperature measurement of the system. The temperature relay is used to break the electrical connection form the high-voltage battery to the auxiliary low-voltage battery, if the current temperature is greater than or less than the temperature range. Thus, the system is protected from a temperature malfunction.

Figure 22:
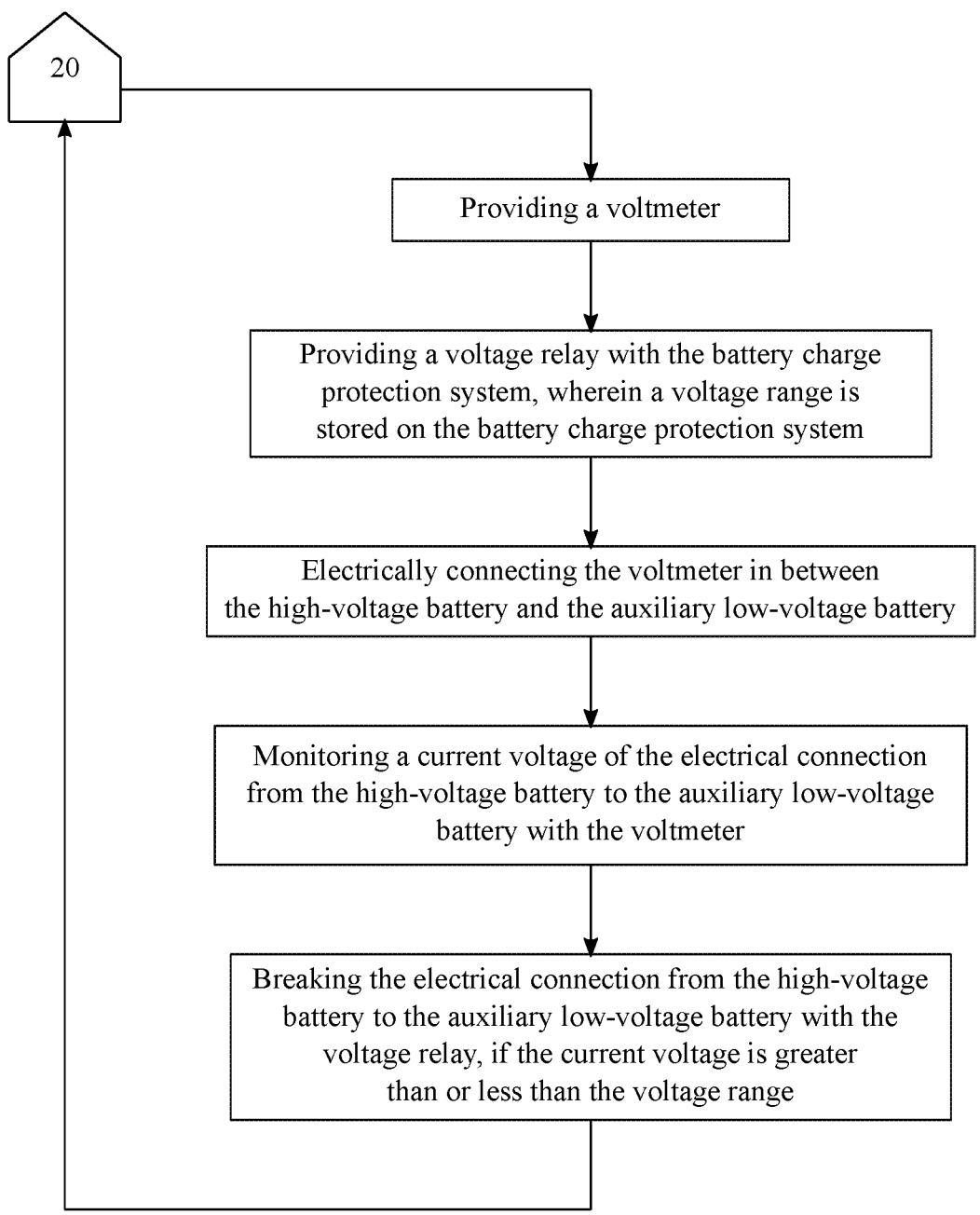
FIG. 22 is a flowchart illustrating the subprocess of breaking the electrical connection of the system with the voltage relay.

With reference to FIGS. 19 and 22, the system may further be provided with a voltmeter. The voltmeter is used to measure the voltage of the system. Further, a voltage relay is provided with the battery charge protection system. A voltage range is stored on the battery charge protection system. The voltage range is a specific range of voltages where the operation of the system is safe and efficient. For the voltmeter to accurately measure the voltage of the system, the voltmeter is electrically connected in between the high-voltage battery and the auxiliary low-voltage battery. The voltmeter is used to monitor a current voltage of the electrical connection from the high-voltage battery to the auxiliary low-voltage battery. The current voltage is a live voltage measurement of the system. The voltage relay is used to break the electrical connection form the high-voltage battery to the auxiliary low-voltage battery, if the current voltage is greater than or less than the voltage range. Thus, the system is protected from a voltage malfunction.

Figure 23:
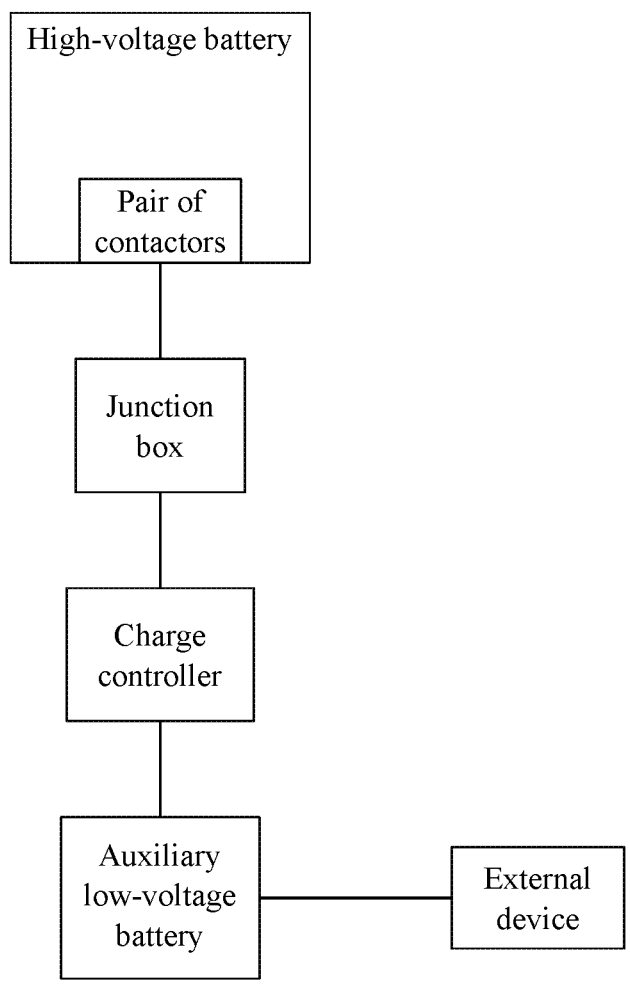
FIG. 23 is a block diagram illustrating another embodiment of the system with the charge controller.
Figure 24:
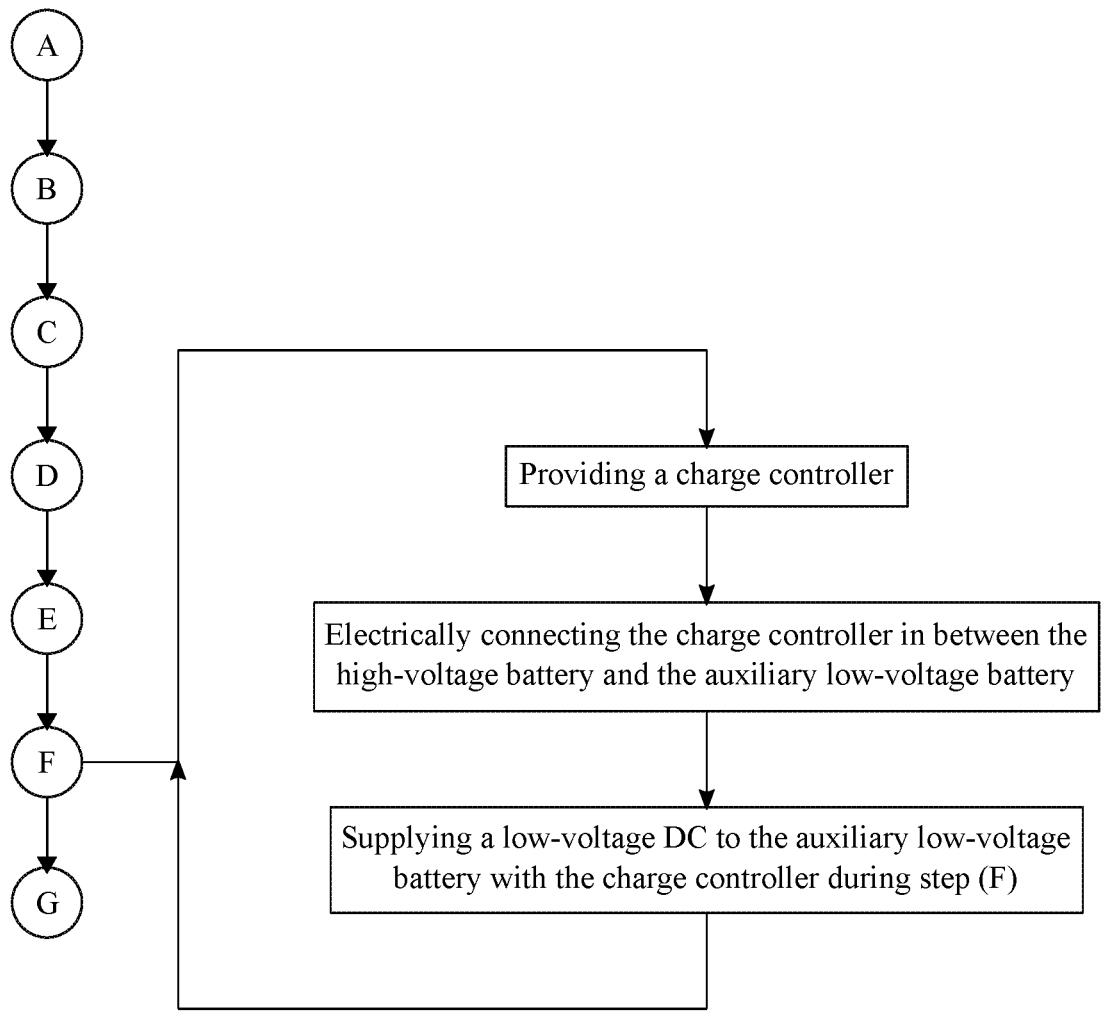
FIG. 24 is a flowchart illustrating the subprocess of charging the auxiliary low-voltage using the charge controller.

In another embodiment and with reference to FIGS. 23 and 24, the system is provided with the charge controller as the power modifier. The charge controller is preferably a much higher voltage charger. For example, the charge controller is preferably a 600-volt, 80-amp charger such as, but not limited to, a Morningstar Tristar MPPT 600V solar charge controller. Moreover, the charge controller is programmable for variable currents and battery systems. The charge controller is electrically connected in between the multi-voltage power supply and the auxiliary low-voltage battery. This allows the charge controller to directly charge the auxiliary low-voltage battery. The charge controller is used to supply a low-voltage DC to the auxiliary low-voltage battery during Step F. Thus, the charge controller can efficiently and safely charge the auxiliary low-voltage battery without the use of a power supply.

Figure 25:
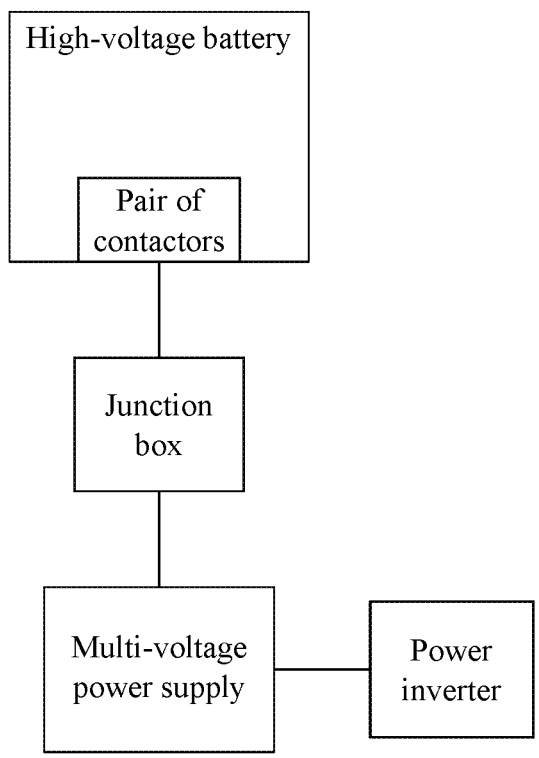
FIG. 25 is a block diagram illustrating another embodiment of the system with the multi-voltage power supply and the current inverter.

In another embodiment and with reference to FIG. 25, the system is provided with the multi-voltage power supply and a power inverter. The multi-voltage power supply is preferably, but not limited to, a Meanwell SDR-480P power supply or a DPU-3200 power supply. The multi-voltage power supply is electrically connected to the high-voltage battery through the external output. Moreover, the power inverter is directly and electrically connected to the multi-voltage power supply. This embodiment of the system is not used to charge the auxiliary low-voltage battery. Thus, the auxiliary low-voltage battery is not included in this embodiment of the system. The electrical connection between the multi-voltage power supply and the power inverter creates an unbuffered power source of up to 3000 watts. The electrically-driven vehicle must be in park in order for this embodiment to function properly.

Figure 26:
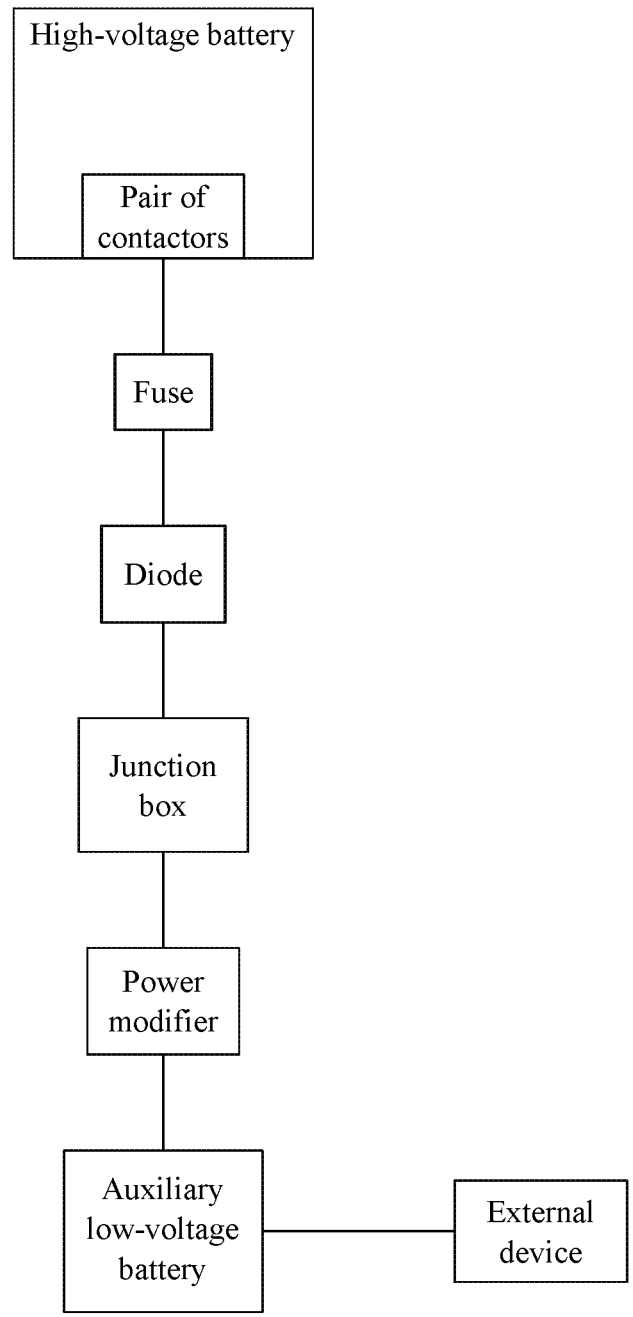
FIG. 26 is a block diagram illustrating another embodiment of the system with a fuse and a diode.

In another embodiment and with reference to FIG. 26, the system may further be provided with a fuse and a diode. The fuse protects the system from an overcurrent exchange. The diode is used to allow only one-way electricity flow throughout the system. The fuse and the diode are electrically connected in between the high-voltage battery and the auxiliary low-voltage battery. Thus, the fuse can protect the system from too much current flowing through the system and the diode can establish a one-way electricity flow throughout the system.

Although the invention has been explained in relation to its preferred embodiment, it is to be understood that many other possible modifications and variations can be made without departing from the spirit and scope of the invention as hereinafter claimed.

What is claimed is:

1. A method of powering an external device with a vehicular battery system, the method comprises the steps of:
   (A) providing an electrically-driven vehicle, wherein the electrically-driven vehicle comprises at least one high-voltage battery and a battery casing, and wherein the high-voltage battery is positioned within the battery casing, and wherein the high-voltage battery comprises a pair of contactors;
   (B) providing a junction box, a power modifier, an auxiliary low-voltage battery, and at least one external device, wherein the junction box comprises an input, an internal output, and an external output;
   (C) modifying the battery casing with a retrofit access point for the pair of contactors;
   (D) electrically connecting the pair of contactors to the input through the retrofit access point;
   (E) electrically connecting the auxiliary low-voltage battery to either the internal output or the external output through the power modifier;
   (F) electrically charging the auxiliary low-voltage battery with the high-voltage battery;
   (G) electrically powering the external device with the auxiliary low-voltage battery;
   providing an on/off relay;
   electrically connecting the on/off relay in between the high-voltage battery and the auxiliary low-voltage battery;
   toggling the electrical connection from the high-voltage battery to the auxiliary low-voltage battery between an open state and a closed state with the on/off relay;
   providing the electrical connection from the high-voltage battery to the auxiliary low-voltage battery in the closed state;
   providing a user controller, wherein the user controller is communicably coupled to the on/off relay through a wireless communication module of the on/off relay;
   prompting to select the open state with the user controller;
   relaying a selection of the open state from the user controller to the on/off relay, if the open state is selected by the user controller; and
   toggling the electrical connection from the high-voltage battery to the auxiliary low-voltage battery from the closed state to the open state with the on/off relay.

2. The method of powering the external device with the vehicular battery system, as claimed in claim 1, comprises the steps of:
   wherein the auxiliary low-voltage battery is positioned within the electrically-driven vehicle; and
   electrically connecting the auxiliary low-voltage battery to the internal output through the power modifier during step (E).

3. The method of powering the external device with the vehicular battery system, as claimed in claim 2, comprises the steps of:
   providing an internal quick-disconnect device; and
   electrically connecting the power modifier to the internal output through the internal quick-disconnect device during step (E).

4. The method of powering the external device with the vehicular battery system, as claimed in claim 1, comprises the steps of:
   wherein the auxiliary low-voltage battery is positioned external to the electrically-driven vehicle; and
   electrically connecting the auxiliary low-voltage battery to the external output through the power modifier during step (E).

5. The method of powering the external device with the vehicular battery system, as claimed in claim 4, comprises the steps of:
   providing an external quick-disconnect device; and
   electrically connecting the power modifier to the external output through the external quick-disconnect device during step (E).

6. The method of powering the external device with the vehicular battery system, as claimed in claim 1, comprises the steps of:
   providing a multi-voltage power supply and a charge controller as the power modifier;
   electrically connecting the multi-voltage power supply in between the high-voltage battery and the auxiliary low-voltage battery;
   electrically connecting the charge controller in between the multi-voltage power supply and the auxiliary low-voltage battery;

converting a high-voltage direct current (DC) from the high-voltage battery to a low-voltage DC with the multi-voltage power supply; and supplying the low-voltage DC to the auxiliary low-voltage battery with the charge controller during step (F).

7. The method of powering the external device with the vehicular battery system, as claimed in claim 6, comprises the steps of:

providing an optimal voltage value of the auxiliary low-voltage battery;

measuring an actual voltage value of the low-voltage DC with the charge controller;

modifying the low-voltage DC from the actual voltage value into the optimal voltage value with the charge controller; and supplying the low-voltage DC at the optimal voltage value to the auxiliary low-voltage battery with the charge controller during step (F).

8. The method of powering the external device with the vehicular battery system, as claimed in claim 6, comprises the steps of:

providing a current inverter;

electrically connecting the current inverter in between the auxiliary low-voltage battery and the external device; and inverting the low-voltage DC to alternating current (AC) with the current inverter before step (G).

9. The method of powering the external device with the vehicular battery system, as claimed in claim 6, comprises the steps of:

providing at least one solar panel;

electrically connecting the charge controller to the solar panel;

converting solar energy into a solar supplemental DC with the solar panel; and supplying the solar supplemental DC to the auxiliary low-voltage battery with the charge controller during step (F).

10. The method of powering the external device with the vehicular battery system, as claimed in claim 9, comprises the steps of:

providing an optimal voltage value of the auxiliary low-voltage battery;

measuring an actual voltage value of the solar supplemental DC with the charge controller;

modifying the solar supplemental DC from the actual voltage value into the optimal voltage value with the charge controller; and supplying the solar supplemental DC at the optimal voltage value to the auxiliary low-voltage battery with the charge controller during step (F).

11. The method of powering the external device with the vehicular battery system, as claimed in claim 1, comprises the steps of:

providing a programmable charger as the power modifier;

electrically connecting the programmable charger in between the high-voltage battery and the auxiliary low-voltage battery; and converting a high-voltage DC from the high-voltage battery to a low-voltage DC with the programmable charger before step (F).

12. The method of powering the external device with the vehicular battery system, as claimed in claim 1, comprises the steps of:

providing the electrical connection from the high-voltage battery to the auxiliary low-voltage battery in the open state;

wherein the user controller is communicably coupled to the on/off relay through the wireless communication module of the on/off relay;

prompting to select the closed state with the user controller;

relaying a selection of the closed state from the user controller to the on/off relay, if the closed state is selected by the user controller; and toggling the electrical connection from the high-voltage battery to the auxiliary low-voltage battery from the open state to the closed state with the on/off relay.

13. The method of powering the external device with the vehicular battery system, as claimed in claim 1, comprises the steps of:

providing a battery charge protection system; and electrically connecting the battery charge protection system in between the high-voltage battery and the auxiliary low-voltage battery.

14. The method of powering the external device with the vehicular battery system, as claimed in claim 13, comprises the steps of:

providing a temperature sensor;

providing a temperature relay with the battery charge protection system, wherein a temperature range is stored on the battery charge protection system;

electrically connecting the temperature sensor in between the high-voltage battery and the auxiliary low-voltage battery;

monitoring a current temperature of the electrical connection from the high-voltage battery to the auxiliary low-voltage battery with the temperature sensor; and breaking the electrical connection from the high-voltage battery to the auxiliary low-voltage battery with the temperature relay, if the current temperature is greater than or less than the temperature range.

15. The method of powering the external device with the vehicular battery system, as claimed in claim 13, comprises the steps of:

providing a voltmeter;

providing a voltage relay with the battery charge protection system, wherein a voltage range is stored on the battery charge protection system;

electrically connecting the voltmeter in between the high-voltage battery and the auxiliary low-voltage battery;

monitoring a current voltage of the electrical connection from the high-voltage battery to the auxiliary low-voltage battery with the voltmeter; and breaking the electrical connection from the high-voltage battery to the auxiliary low-voltage battery with the voltage relay, if the current voltage is greater than or less than the voltage range.

16. The method of powering the external device with the vehicular battery system, as claimed in claim 1, comprises the steps of:

providing a charge controller as the power modifier;

electrically connecting the charge controller in between the high-voltage battery and the auxiliary low-voltage battery; and supplying a low-voltage DC to the auxiliary low-voltage battery with the charge controller during step (F).

* * * * *